(12) United States Patent
Sampath et al.

(10) Patent No.: US 9,451,590 B2
(45) Date of Patent: Sep. 20, 2016

(54) EXTENDING RANGE AND DELAY SPREAD IN WIFI BANDS

(71) Applicant: QUALCOMM Incorporated, San Diego, CA (US)

(72) Inventors: Hemanth Sampath, San Diego, CA (US); Vincent Knowles Jones, IV, Redwood City, CA (US); Sameer Vermani, San Diego, CA (US); Didier Johannes Richard Van Nee, Tull en't Waal (NL); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 14/165,390

(22) Filed: Jan. 27, 2014

(65) Prior Publication Data

US 2014/0211704 A1    Jul. 31, 2014

Related U.S. Application Data

(60) Provisional application No. 61/758,222, filed on Jan. 29, 2013, provisional application No. 61/757,669, filed on Jan. 28, 2013.

(51) Int. Cl.
| | |
|---|---|
| *H04W 72/04* | (2009.01) |
| *H04W 28/06* | (2009.01) |
| *H04L 27/26* | (2006.01) |
| *H04L 1/00* | (2006.01) |

(52) U.S. Cl.
CPC .......... *H04W 72/04* (2013.01); *H04L 27/2613* (2013.01); *H04W 28/065* (2013.01); *H04L 1/004* (2013.01)

(58) Field of Classification Search
None
See application file for complete search history.

(56) References Cited

U.S. PATENT DOCUMENTS

| | | | | |
|---|---|---|---|---|
| 2008/0181323 | A1* | 7/2008 | Waters | H04L 27/2647 375/260 |
| 2009/0175372 | A1* | 7/2009 | Moon | H04W 88/06 375/260 |
| 2011/0051705 | A1* | 3/2011 | Jones, IV | H04L 27/2613 370/338 |
| 2012/0257558 | A1* | 10/2012 | Shin | H04W 52/0229 370/311 |

FOREIGN PATENT DOCUMENTS

WO    WO-2009053943 A2    4/2009

OTHER PUBLICATIONS

International Search Report and Written Opinion—PCT/US2014/013331—ISA/EPO—May 9, 2014.

(Continued)

*Primary Examiner* — Kodzovi Acolatse
(74) *Attorney, Agent, or Firm* — Patterson & Sheridan, L.L.P.

(57) ABSTRACT

Certain aspects of the present disclosure relate to methods and apparatus for extending range and delay spread in 2.4 and 5 GHz bands, and potentially frequency multiplexing users. An apparatus is provided for wireless communications. The apparatus generally includes a processing system configured to generate a packet comprising a first preamble decodable by a first type of device and a second type of device, a second preamble that is decodable by the second type of device, but not the first type of device, and data and a transmitter configured to transmit the packet, wherein the first preamble is transmitted using a first channel bandwidth and the second preamble and data are transmitted using only a portion of the first channel bandwidth.

20 Claims, 20 Drawing Sheets

(56) References Cited

OTHER PUBLICATIONS

Sun Bo (ZTE Corporation): "11ah PLCP Preamble Design; 11-11-1502-02-00ah-11ah-plcp-preamble-design", IEEE SA Mentor; 11-11-1502-02-00AH-11AH-PLCP-PREAMBLE-DESIGN, IEEE-SA Mentor, Piscataway, NJ USA, vol. 802 .llah, No. 2, Nov. 7, 2011, pp. 1-9, XP068037828, [Retrieved on Nov. 7, 2011].

Zhang H (Marvell): "11ah preamble for 2MHz and beyond; 11-11-1483-02-00ah-11ah-preamble-for-2mhzand-beyond", IEEE SA Mentor; 11-11-1483-02-00Ah PREAMBLE-FOR-2MHZAND-BEYOND, IEEE-SA Mentor, Piscataway, NJ, USA, vol. 802. llah. No. 2. Jan. 16, 2012, pp. 1-24, XP068037797, [retrieved on Jan. 1, 2012].

\* cited by examiner

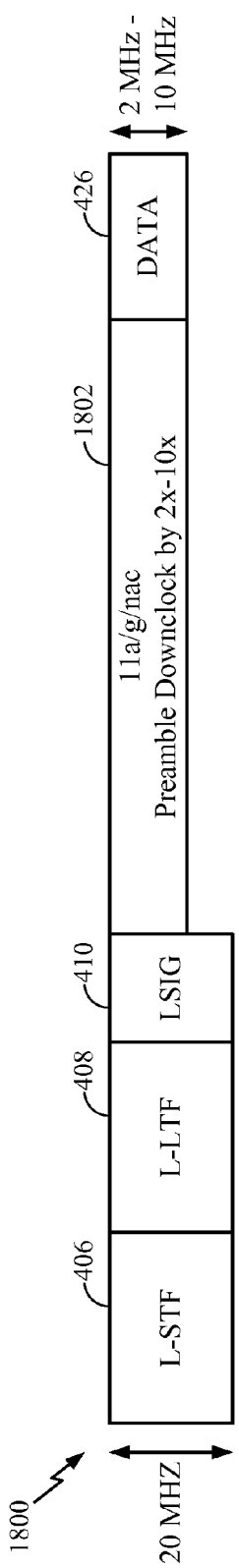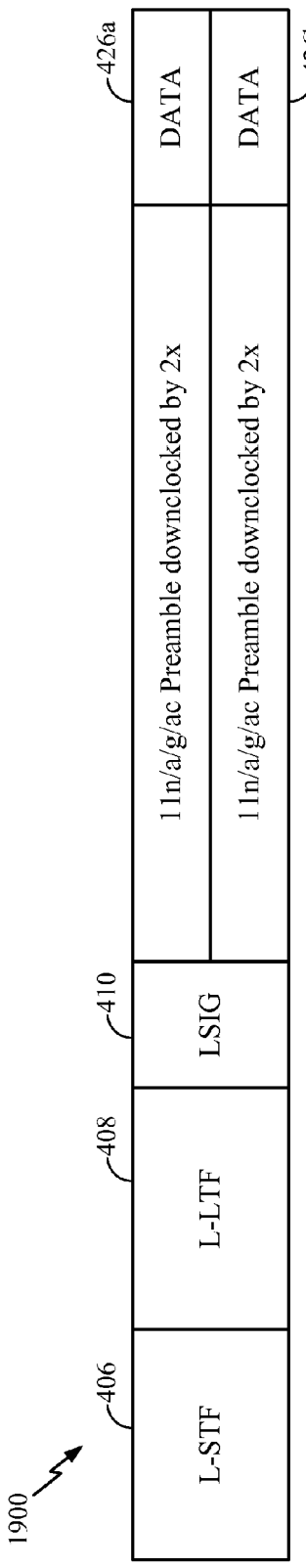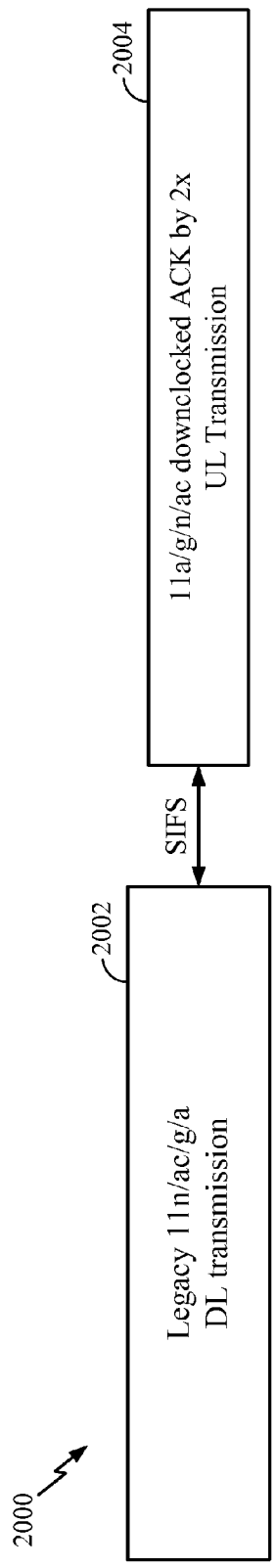
FIG. 18
FIG. 19
FIG. 20

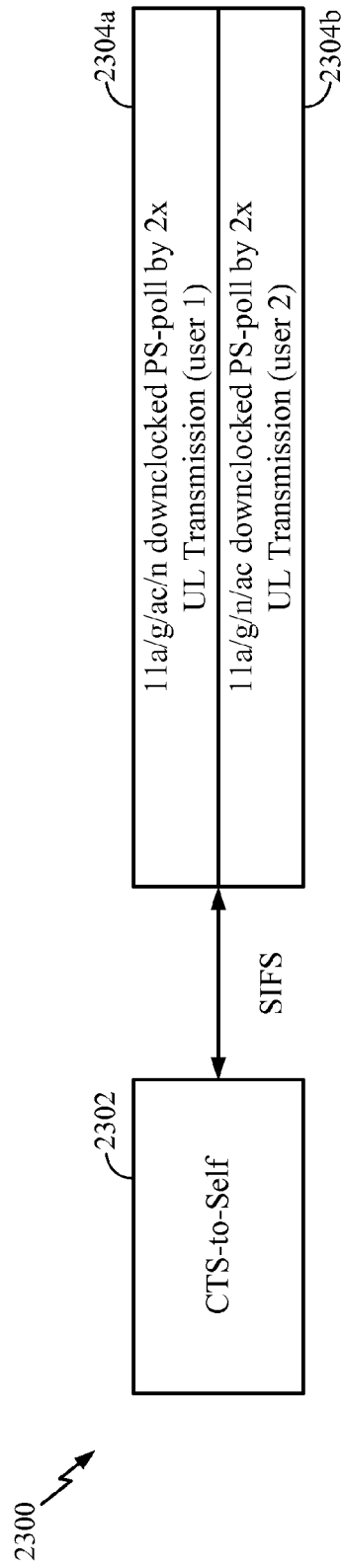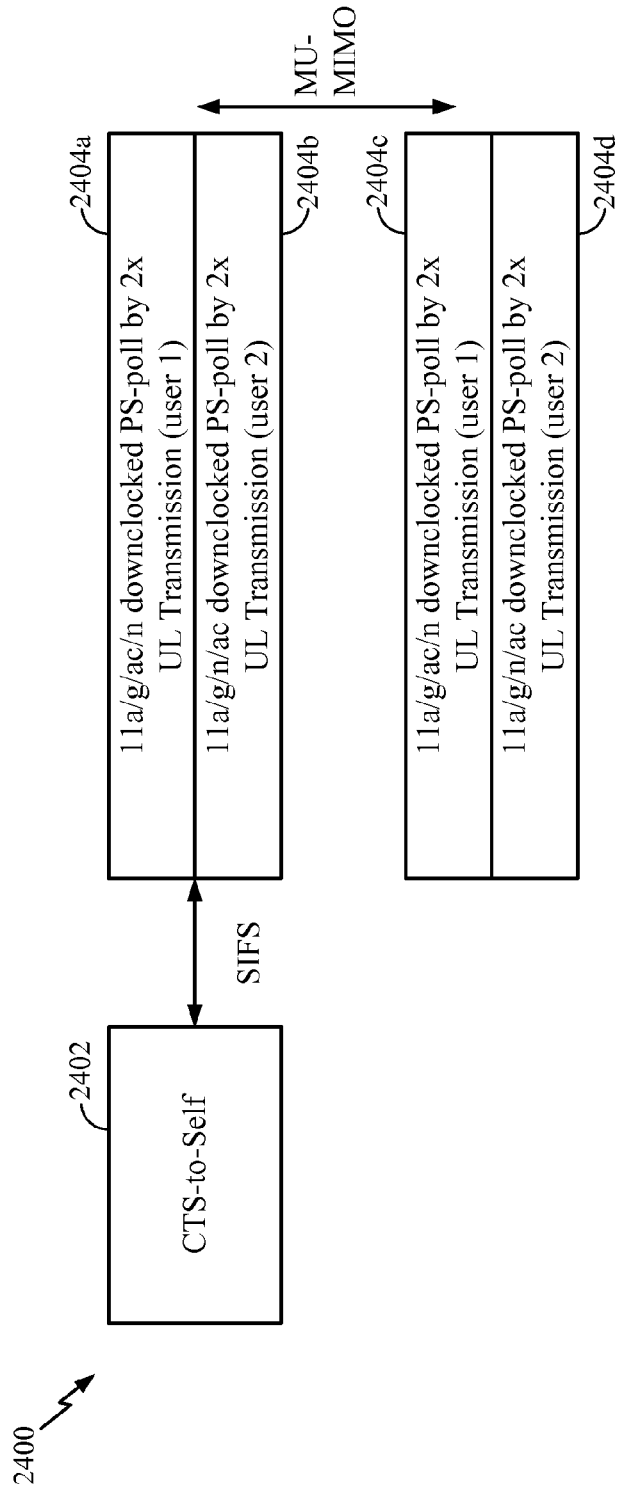

| Site | Height (m) | Azimuth | Antenna | Antenna Gain (dBi) | Mechanical Downtilt | Electrical Downtilt | Latitude | Longitude | Tx Power (dBm) | Cable Loss (dB) | EIRP (dBm) | EIRP (W) |
|---|---|---|---|---|---|---|---|---|---|---|---|---|
| N | 147 | 260° | 742.215 | 18 | 2° | 2° | 32.897 | -117.196 | 37 | 2 | 53 | 204 |
| WT | 158 | 235° | 742.215 | 18 | 6° | 2° | 32.904 | -117.197 | 37 | 2 | 53 | 204 |
| T | 126 | 341° | 742.210 | 9 | 80° | 0° | 32.534 | -117.114 | 9 | 6 | 12 | 16mW |
| AM | 91 | Omni | 800.10431 | 2 | NA | NA | 32.535 | -117.129 | 30 | 12 | 20 | 100mW |
| R | 114 | Omni | 800.10431 | 2 | NA | NA | 32.541 | -117.120 | 18 | 6 | 14 | 25mW |

EXTENDING RANGE AND DELAY SPREAD IN WIFI BANDS

CLAIM OF PRIORITY UNDER 35 U.S.C. §119

This application claims benefit of U.S. Provisional Patent Application Ser. No. 61/758,222, filed Jan. 29, 2013, which is herein incorporated by reference in its entirety, and U.S. Provisional Patent Application Ser. No. 61/757,669, filed Jan. 28, 2013, which is herein incorporated by reference in its entirety.

BACKGROUND

1. Field

Certain aspects of the present disclosure generally relate to wireless communications and, more particularly, to extending range and delay spread in WiFi bands (e.g., in the 2.4 GHz and 5 GHz bands) and PHY changes for outdoor deployments.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally relate to extending range and delay spread in WiFi bands (e.g., in the 2.4 GHz and 5 GHz bands) and PHY changes for outdoor deployments.

Certain aspects of the present disclosure provide an apparatus for wireless communications. The apparatus generally includes a processing system configured to generate a packet comprising a first preamble decodable by a first type of device and a second type of device, a second preamble that is decodable by the second type of device, but not the first type of device, and data and a transmitter configured to transmit the packet, wherein the first preamble is transmitted using a first channel bandwidth and the second preamble and data are transmitted using only a portion of the first channel bandwidth.

Certain aspects of the present disclosure provide an apparatus for wireless communications. The apparatus generally includes a processing system configured to detect a first packet, transmitted from a second apparatus, comprising a first preamble decodable by a first type of device and a second type of device and generate, in response to the detecting, a second packet comprising a second preamble that is decodable by the second type of device, but not the first type of device, and data and a transmitter configured to transmit, to the second apparatus, the second packet, wherein the first preamble is transmitted using a first channel bandwidth and the second preamble and data are transmitted using only a portion of the first channel bandwidth.

Certain aspects of the present disclosure provide a method for wireless communications. The method generally includes generating a packet comprising a first preamble decodable by a first type of device and a second type of device, a second preamble that is decodable by the second type of device, but not the first type of device, and data and transmitting the packet, wherein the first preamble is transmitted using a first channel bandwidth and the second preamble and data are transmitted using only a portion of the first channel bandwidth.

Certain aspects of the present disclosure provide a method for wireless communications. The method generally includes detecting, by a first apparatus, a first packet, transmitted from a second apparatus, comprising a first preamble decodable by a first type of device and a second type of device, generating, in response to the detecting, a second packet comprising a second preamble that is decodable by the second type of device, but not the first type of device, and data, and transmitting, to the second apparatus, the second packet, wherein the first preamble is transmitted using a first channel bandwidth and the second preamble and data are transmitted using only a portion of the first channel bandwidth.

Certain aspects of the present disclosure provide a method for wireless communications. The method generally includes receiving a packet comprising a first preamble decodable by a first type of device and a second type of device, a second preamble that is decodable by the second type of device, but not the first type of device, and data, wherein the first preamble is transmitted using a first channel bandwidth and the second preamble and data are transmitted using only a portion of the first channel bandwidth and processing the packet.

Certain aspects of the present disclosure provide a method for wireless communications. The method generally includes transmitting a first packet to a device, the first packet comprising a first preamble decodable by a first type of device and a second type of device and receiving, from the device, a second packet comprising a second preamble that is decodable by the second type of device, but not the first type of device, and data, wherein the first preamble is transmitted from the apparatus using a first channel bandwidth and the second preamble and data are transmitted using only a portion of the first channel bandwidth.

Certain aspects of the present disclosure provide a method for wireless communications. The method generally includes generating a packet comprising a preamble and data, wherein the preamble is of a format defined for transmission at a first channel bandwidth and transmitting the packet to at least one other apparatus, wherein the preamble and data are transmitted in an upclocked manner using a channel bandwidth greater than the first channel bandwidth.

Certain aspects of the present disclosure provide a method for wireless communications. The method generally includes receiving a packet comprising a preamble and data, wherein the preamble is of a format defined for transmission at a first channel bandwidth and wherein the preamble and data are transmitted in an upclocked manner using a channel bandwidth greater than the first channel bandwidth and decoding the packet.

Various aspects also provide various apparatuses, program products, and devices (e.g., access points and other types of wireless devices) capable of performing the operations of the methods described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 18 illustrates an example preamble structure, in accordance with certain aspects of the present disclosure.

FIG. 19 illustrates an example preamble structure, in accordance with certain aspects of the present disclosure.

FIG. 20 illustrates an example sequence of transmissions with DL data and UL ACK, in accordance with certain aspects of the present disclosure.

FIGS. 22A-24 illustrate example sequences of transmissions with UL data, in accordance with certain aspects of the present disclosure.

DETAILED DESCRIPTION

Figure 1:
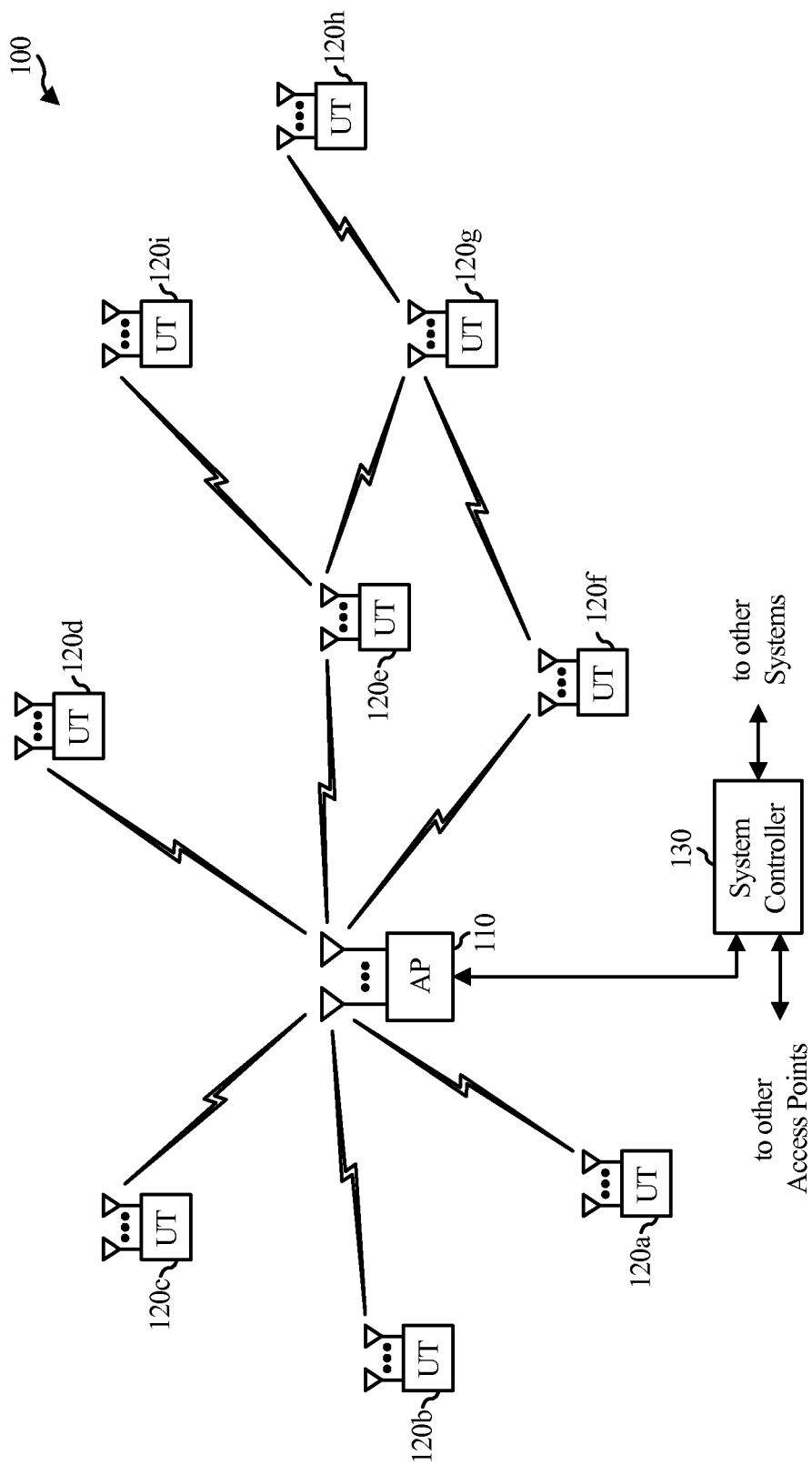
FIG. 1 illustrates a diagram of a wireless communications network, in accordance with certain aspects of the present disclosure.

Various aspects are described herein that may help extend allowable range and delay spreads when using WiFi bands, such as 2.4 GHz and 5 GHz bands and PHY changes for outdoor deployments.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
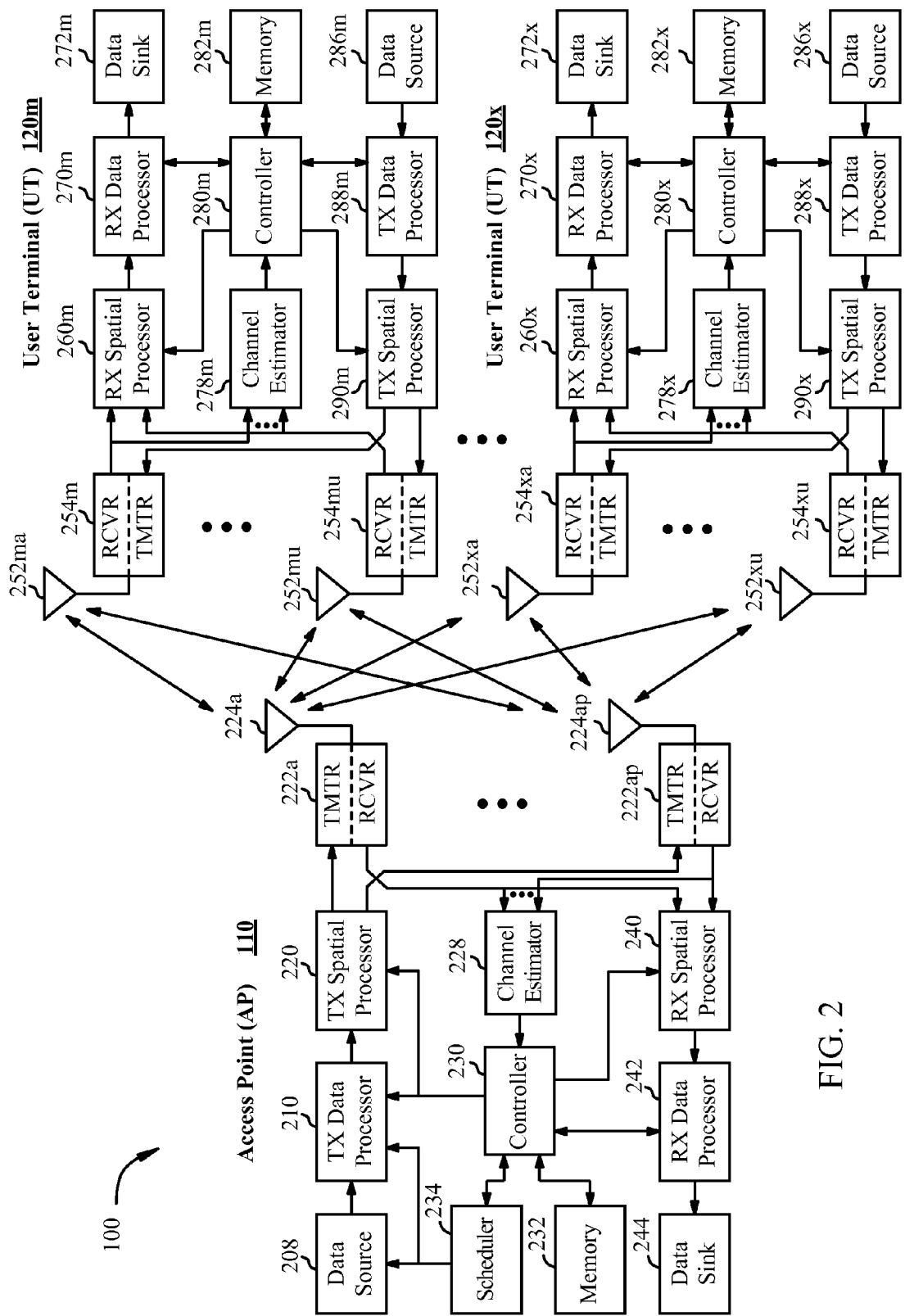
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix Hdn,m for that user terminal. Controller 230 derives the spatial filter matrix for the access point based on the effective uplink channel response matrix Hup,eff. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
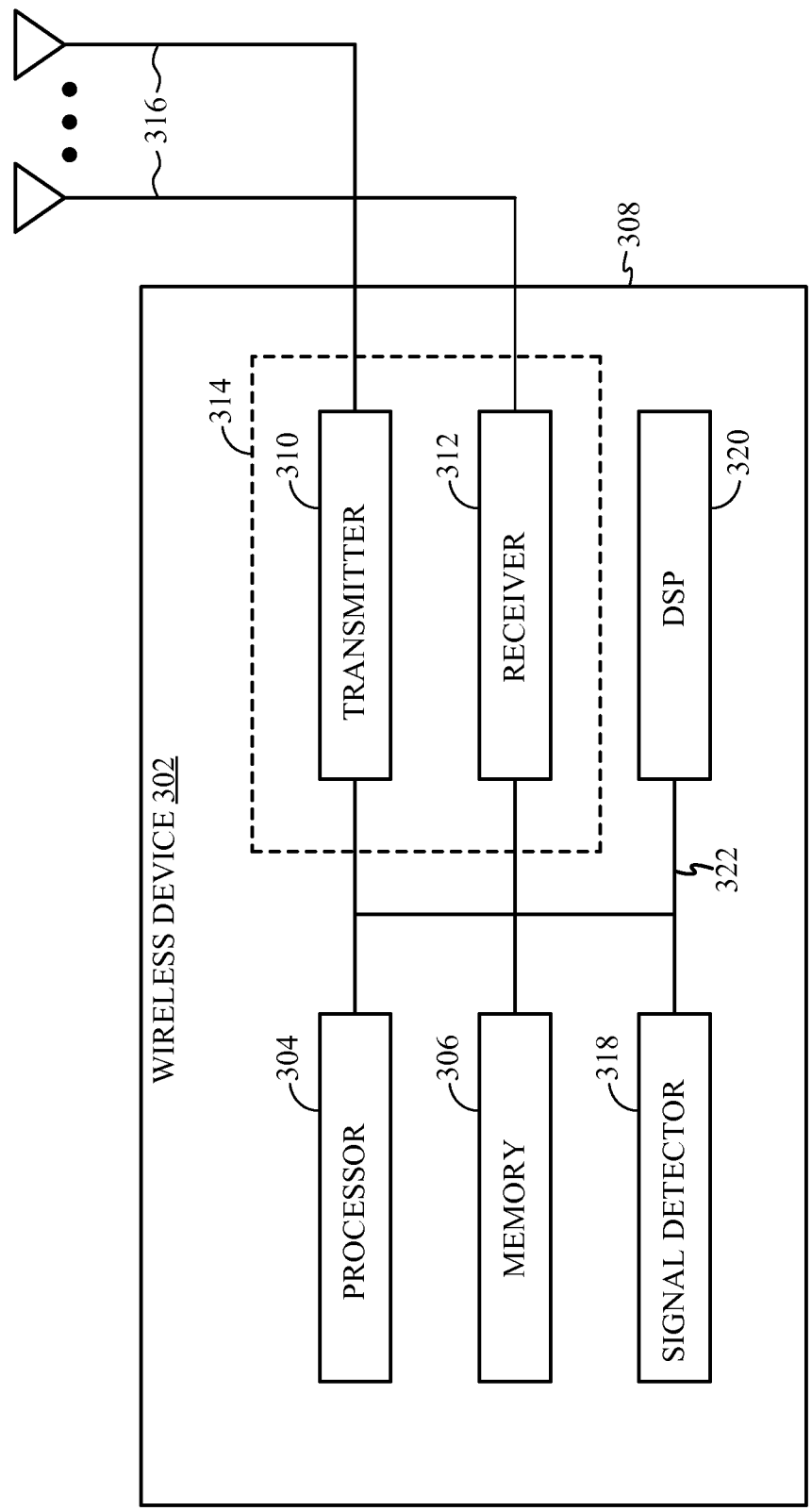
FIG. 3 illustrates a block diagram of an example wireless device, in accordance with certain aspects of the present disclosure.

FIG. 3 illustrates various components that may be utilized in a wireless device 302 that may be employed within a wireless communication system (e.g., system 100 of FIG. 1). The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Preamble Structures

Figure 4:
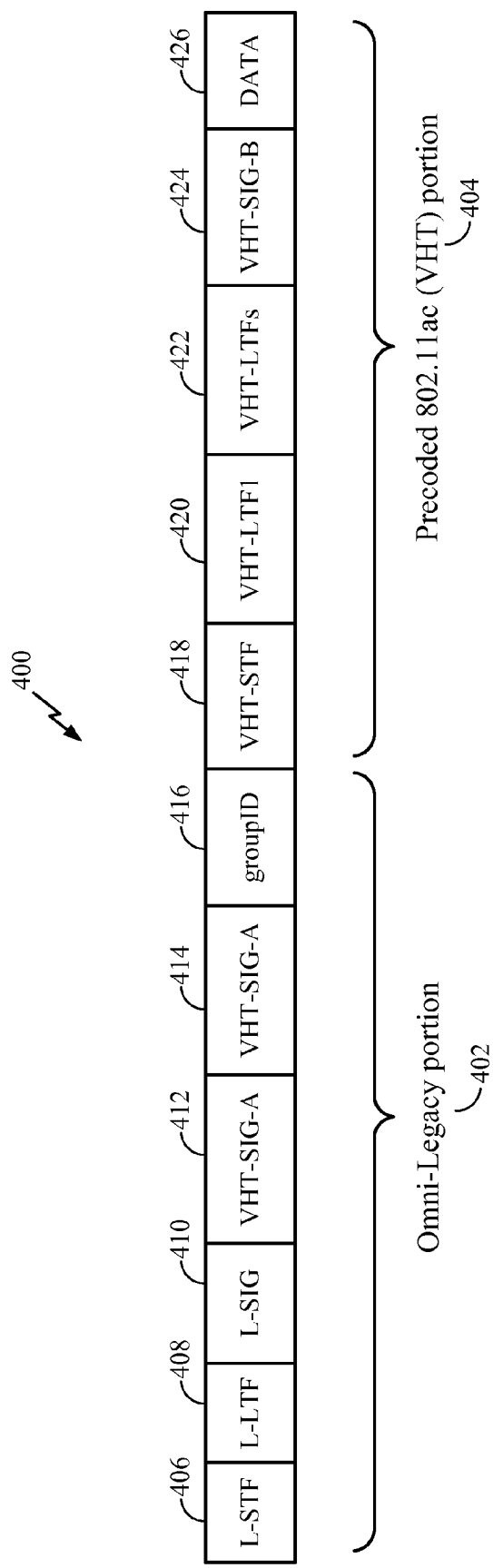
FIG. 4 illustrates an example preamble structure, in accordance with certain aspects of the present disclosure.

FIG. 4 illustrates an example structure of a 11ac preamble 400 in accordance with certain aspects of the present disclosure. The preamble 400 may be transmitted, for example, from the access point (AP) 110 to the user terminals 120 in a wireless network (e.g., system 100 illustrated in FIG. 1).

The preamble 400 may comprise an omni-legacy portion 402 (i.e., the non-beamformed portion) and a precoded 802.11ac VHT (Very High Throughput) portion 404. The legacy portion 402 may comprise: a Legacy Short Training Field (L-STF) 406, a Legacy Long Training Field 408, a Legacy Signal (L-SIG) field 410, and two OFDM symbols 412, 414 for VHT Signal A (VHT-SIG-A) fields. The VHT-SIG-A fields 412, 414 may be transmitted omni-directionally and may indicate allocation of numbers of spatial streams to a combination (set) of STAs. For certain aspects, a group identifier (groupID) field 416 may be included in the preamble 400 to convey to all supported STAs that a particular set of STAs will be receiving spatial streams of a MU-MIMO transmission.

The precoded 802.11ac VHT portion 404 may comprise a Very High Throughput Short Training Field (VHT-STF) 418, a Very High Throughput Long Training Field 1 (VHT-LTF1) 420, Very High Throughput Long Training Fields (VHT-LTFs) 422, a Very High Throughput Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

Figure 5:
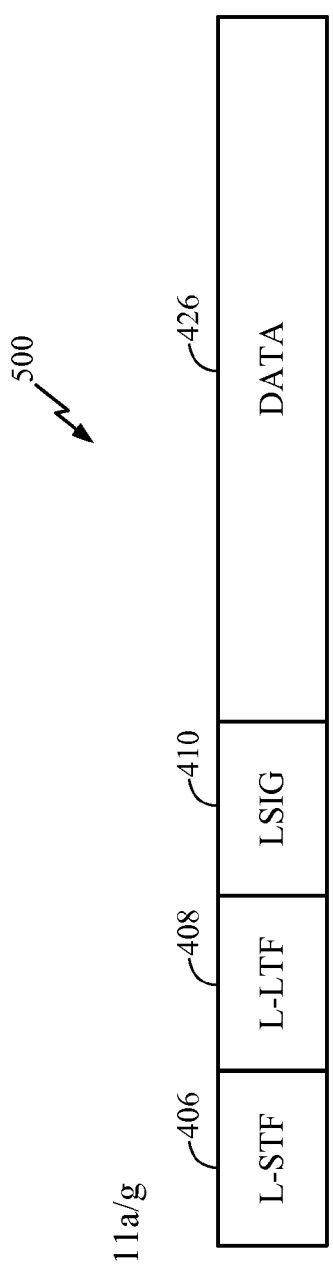
FIG. 5 illustrates an example preamble structure, in accordance with certain aspects of the present disclosure.

FIG. 5 illustrates an example structure of a 11a/g preamble 500 in accordance with certain aspects of the present disclosure. As shown in FIG. 5, the 11a/g physical protocol data unit (PPDU) format may include L-STF 406, L-LTF 408, L-SIG 410, and DATA field 426.

Figure 6:
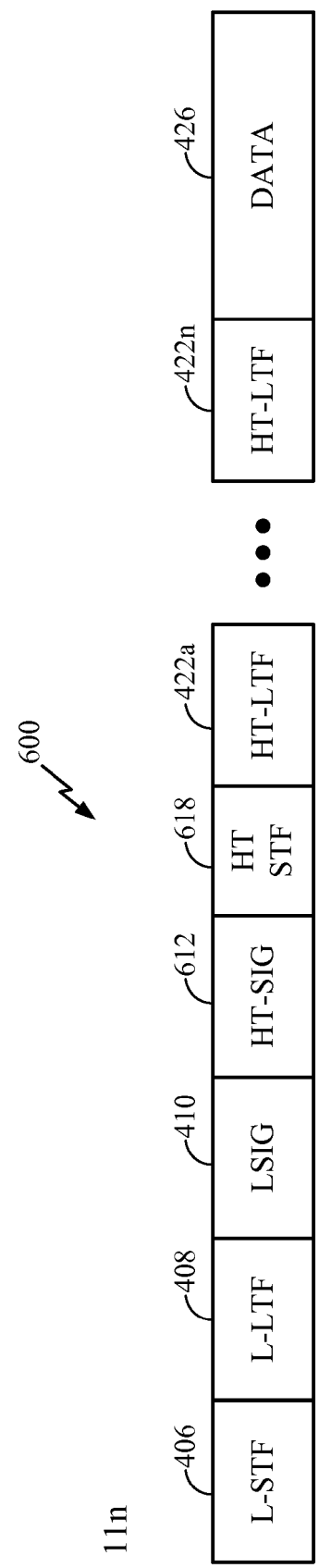
FIG. 6 illustrates an example preamble structure, in accordance with certain aspects of the present disclosure.

FIG. 6 illustrates an example structure of a 11n preamble 600 in accordance with certain aspects of the present disclosure. As shown in FIG. 6, the 11n PPDU format may include the fields of the 11a/g preamble as well as HT-SIG 612, HT STF 618, and one or more HT-LTF 422a ... 422n fields between the L-SIG 410 and DATA field 426.

L-SIG is Binary-Phase Shift-Keying (BPSK) modulated. HT-SIG is Quadrature-BPSK (Q-BPSK) modulated. The second Orthogonal Frequency Division Multiplexing (OFDM) symbol of VHT-SIG is Q-BPSK modulated. The "Q" rotation, allows receivers to differentiate between 11a/g, 11n and 11ac waveforms Extending Range and Delay Spread in WiFi Bands There is significant spectrum in the 5 GHz band, however, the range and coverage of 5 GHz WiFi is often poor. Measurements suggest a 6-10 dB propagation loss with respect to 2.4 GHz WiFi in homes. 802.11 enhanced PHY features such as Low-Density Parity-Check (LDPC), Transmit beamforming, and Space-Time Block coding (STBC) are ineffective in increasing range at 6 Mbps data rates because Control Frames and Management frames cannot use these enhanced PHY features. Unlike the 5 GHz band, the 2.4 GHz band allows the use of 11b 1 Mbps data rates for Control and Management frames.

Apparatus and techniques are provided herein for backwards compatible Preamble and data design for range increase at 6 Mbps data rates in the 5 GHz band or in the 2.4 GHz band with legacy (e.g., 80211g/n or "11 a/g/n/ac" for short) devices. In some embodiments, the techniques and apparatus provided herein may be used exclusively for control packets such as uplink acknowledgment (UL ACK), in order to close the link in scenarios where access point (AP) transmit power is larger than station (STA) transmit power.

It is desirable for new preambles to be backwards compatible with legacy preambles, for example, 11a/g/n/ac preambles shown in FIGS. 4-6. Legacy 11a/g/n/ac devices may be required to decode preamble and defer until transmission is over.

Figure 7:
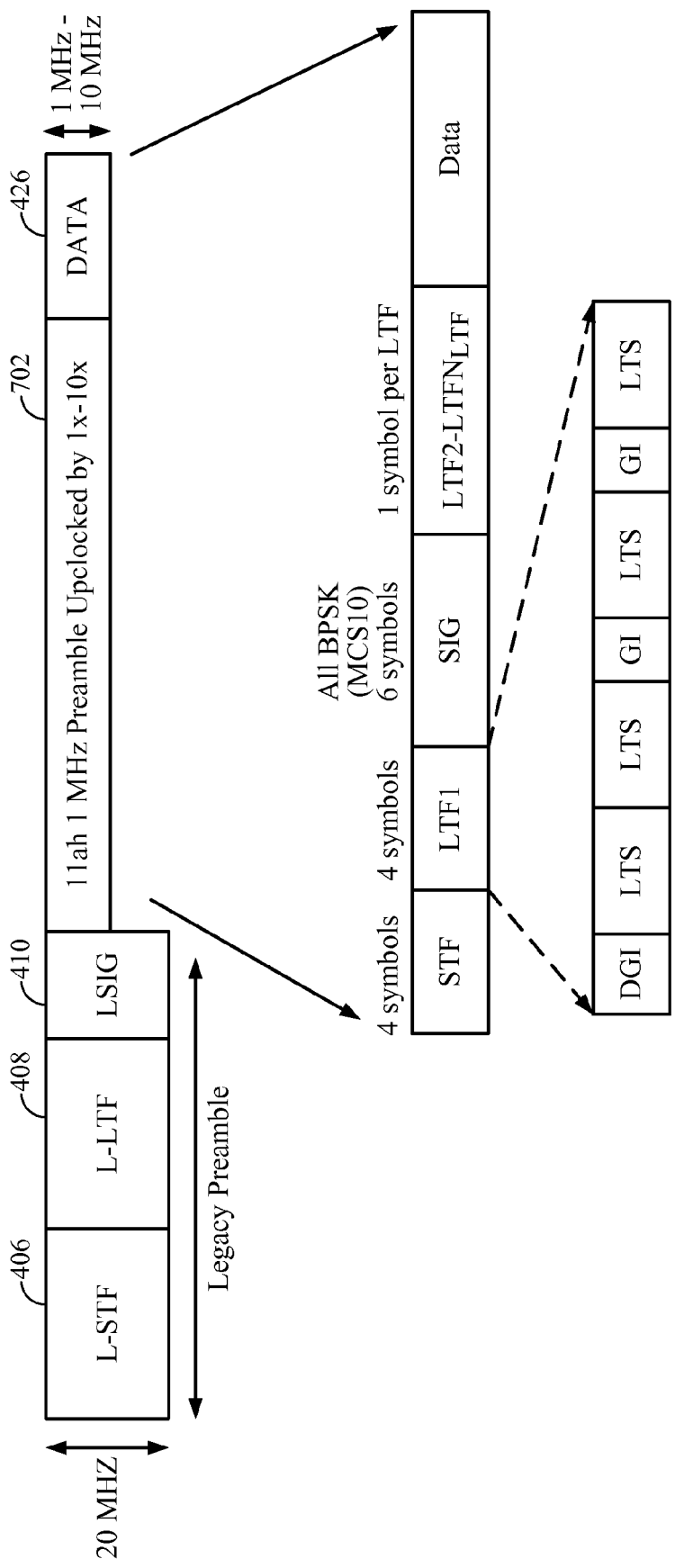
FIG. 7 illustrates an example preamble structure, in accordance with certain aspects of the present disclosure.

According to certain aspects, the legacy 20 MHz preamble (e.g., 11a/g preamble 500) may be appended with the 11ah 1 MHz Preamble 702 ("New Preamble") that is up-clocked by a factor of 1×-10× followed by DATA 426, as shown in FIG. 7. The effective bandwidth of the 11ah waveform following the legacy preamble may be anywhere from 1 MHz to 10 MHz, depending on the up-clock factor. Although shown at the top in FIG. 7, in some embodiments, the frequency domain placement of the 11ah 1 MHz Preamble 702 and DATA 426 may include all possible offsets (e.g., top, center, or bottom).

According to certain aspects, the "upclock" factor of the 11ah 1 MHz Preamble 702 and DATA 426 may be chosen to provide a desired cyclic prefix (CP) duration increase for delay spread mitigation, range increase, and frequency domain multiplexing (FDM) of users. For example, if the upclock factor is 10×, the effective bandwidth of the New Preamble 702 and DATA 426 is 10 MHz. This may provide around a 6 dB increase in effective range of the New Preamble 702 and DATA 426, relative to the legacy preamble 500 (e.g., 4 dB increase from Rep 2 MCS0 mode and 3 dB increase from bandwidth reduction gain from 20 MHz to 10 MHz, with 1 dB loss from frequency diversity). However, the CP may only be 800 ns (i.e., same as legacy preamble), which may not be sufficient to handle large delay spreads, especially in outdoor environments. Only two users may be multiplexed in a 20 MHz bandwidth, one in each 10 MHz bandwidth.

Alternatively if the upclock factor is 5×, the effective bandwidth of New Preamble 702 and DATA 426 may be 5 MHz. This provides around a 7 dB increase in effective range of New Preamble 702 and DATA 426, relative to legacy preamble 500 (i.e., 4 dB increase from Rep 2 MCS0 mode and 6 dB increase from bandwidth reduction gain from 20 MHz to 5 MHz, with 3 dB loss from frequency diversity). However, with the upclocked New Preamble 702 and DATA 426, the CP may now be 3.2 μs (i.e., four times the CP of legacy preamble 500), which may be sufficient to handle large delay spreads, especially in outdoor environments. Thus, in this case, four users may be multiplexed in a 20 MHz bandwidth, one in each 5 MHz bandwidth.

Figure 8:
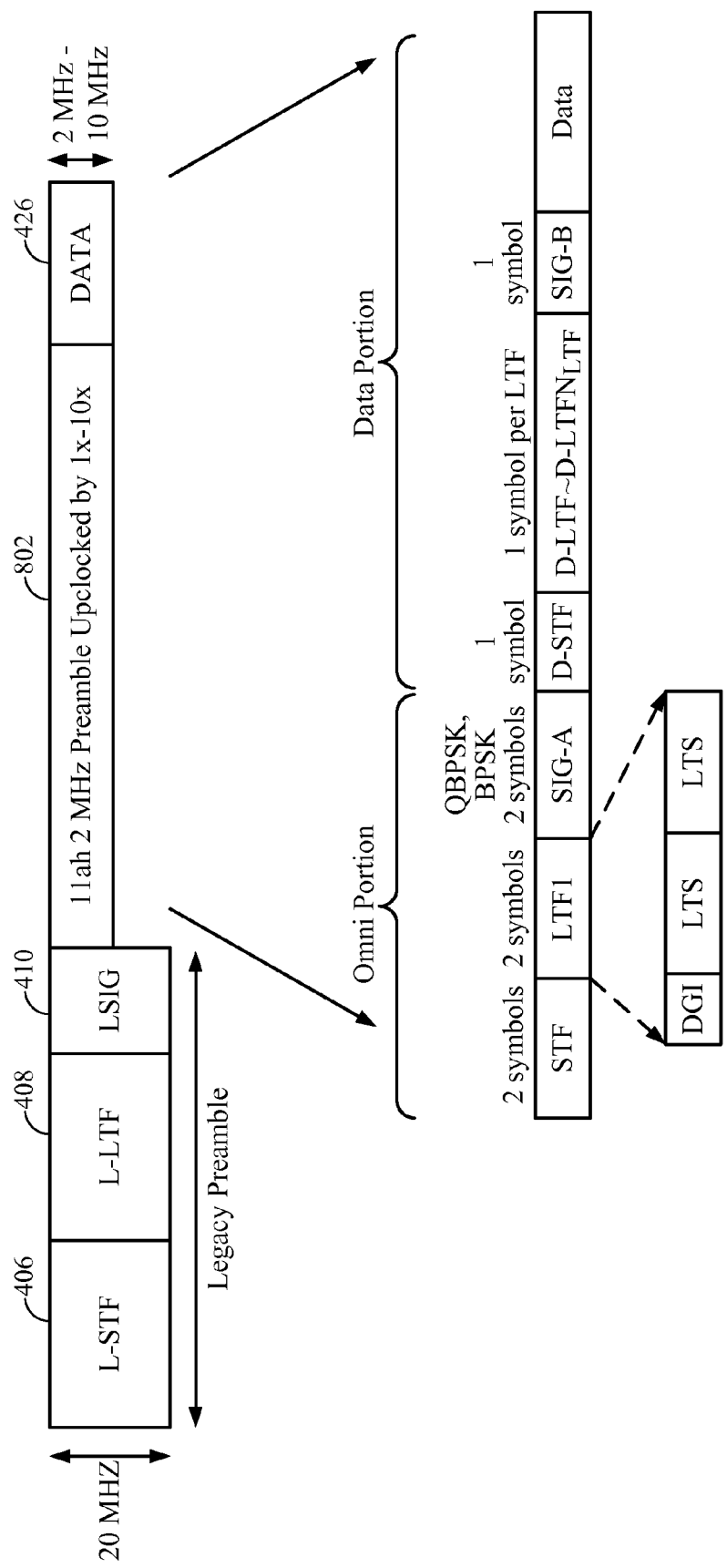
FIG. 8 illustrates an example preamble structure, in accordance with certain aspects of the present disclosure.

According to certain aspects, the Legacy 20 MHz preamble (e.g., 11a/g preamble 500) may instead be appended with an 11ah 2 MHz preamble 802 that is up-clocked by a factor of 1×-5× and followed by DATA 426, as seen in FIG. 8. The effective bandwidth of the 11ah waveform following the legacy preamble 500 may be between 2 MHz to 10 MHz depending on the up-clock factor. Although shown at the top in FIG. 8, the frequency domain placement of the 11ah 2 MHz preamble 802 and DATA 426 may include all possible offsets (e.g., top, middle, or bottom).

According to certain aspects, the upclock factor of 11ah 2 MHz preamble 802 and DATA 426 may be chosen to provide a desired CP duration increase for delay spread mitigation, range increase, and FDM of users. For example, if the upclock factor is 5×, the effective bandwidth of the 11ah 2 MHz preamble 802 and DATA 426 may be 10 MHz. This provides about 2 dB increase in effective range of the 11ah 2 MHz Preamble 802 and DATA 426, relative to legacy preamble (i.e., 3 dB increase from bandwidth reduction gain from 20 MHz to 10 MHz with 1 dB loss due to frequency diversity). However, the CP in this case is 1.6 μs (i.e., 2× the CP of the legacy Preamble), which may not be sufficient to handle large delay spreads, especially in outdoor environments.

As mentioned above, only two users may be multiplexed in the 20 MHz bandwidth, one in each 10 MHz bandwidth. For example, if the upclock factor is 2.5×, the effective bandwidth of the 11ah 2 MHz preamble 802 and DATA 426 may be 5 MHz. This may provide a 3 dB increase in effective range of 11ah 2 MHz Preamble 802 and DATA 426, relative to the legacy preamble (i.e., 6 dB increase from bandwidth reduction gain from 20 MHz to 5 MHz, with 3 dB loss due to frequency diversity). However, the CP in this case is 3.2 μs (i.e., 4× the CP of the legacy preamble), which may be sufficient to handle large delay spreads, especially in outdoor environments. In this case, four users may be multiplexed in 20 MHz bandwidth, one in each 5 MHz bandwidth.

For the solutions provided above, legacy STAs which are in-range of the legacy preamble may decode the legacy preamble, L-SIG, and may be busy decoding for the rest of the packet. However, Legacy STAs which are out of range of legacy preamble may begin transmitting in this duration and may cause interference to New Preamble and DATA. In some embodiments, a mechanism may be used to protect the duration of the legacy preamble, for example a dummy ready-to-send (RTS)-clear-to-send (CTS) exchange may be performed with one or more in-range STA(s) that are close to the intended receiver.

According to certain aspects, a decoding rule may be used for new (non-legacy) STAs when they are out of range of legacy preambles. For example, new STAs that are out of range of the legacy preamble may run a New Preamble detector, but wait a duration that is at least legacy preamble plus New Preamble STF before beginning transmitting. If the New Preamble STF successfully fires in this duration, then the New STA may proceed to decode the packet.

Figure 9:
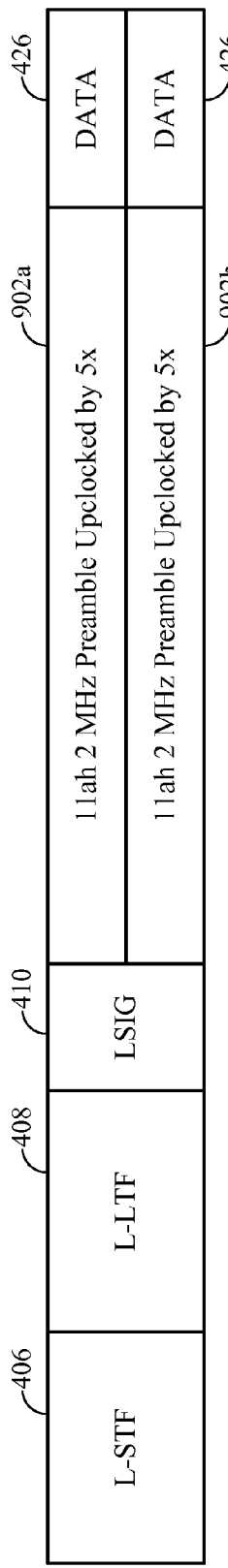
FIG. 9 illustrates an example preamble structure, in accordance with certain aspects of the present disclosure.

According to certain aspects, in the DL, the AP may use New Preamble and DATA to increase range and multiplex data or control packets across users. FIG. 9 illustrates an example structure of a legacy 20 MHz preamble 406, 408, 410 appended to an up-clocked 11ah 2 MHz preamble 902a, 902b and followed by DATA 426 with FDM multiplexing of two users, in accordance with certain aspects of the present disclosure.

Figure 10:
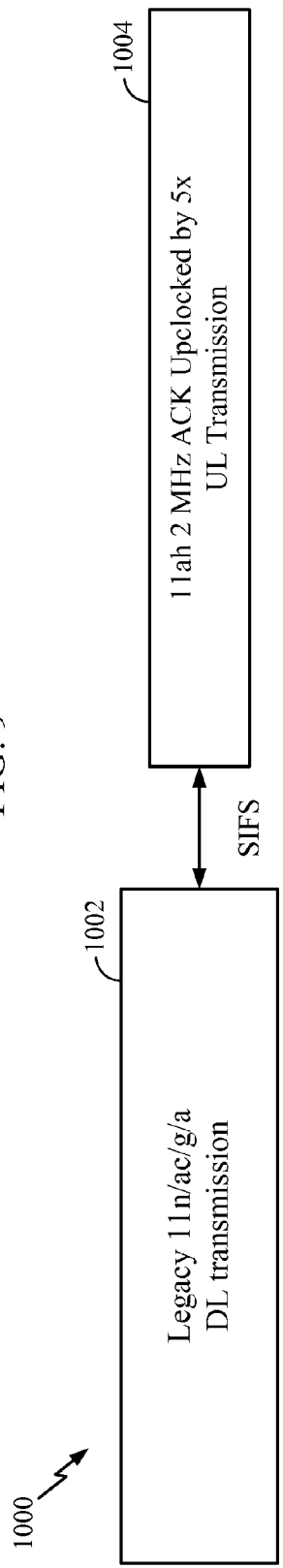
FIG. 10 illustrates an example sequence of transmissions with DL data and UL ACK, in accordance with certain aspects of the present disclosure.
Figure 11:
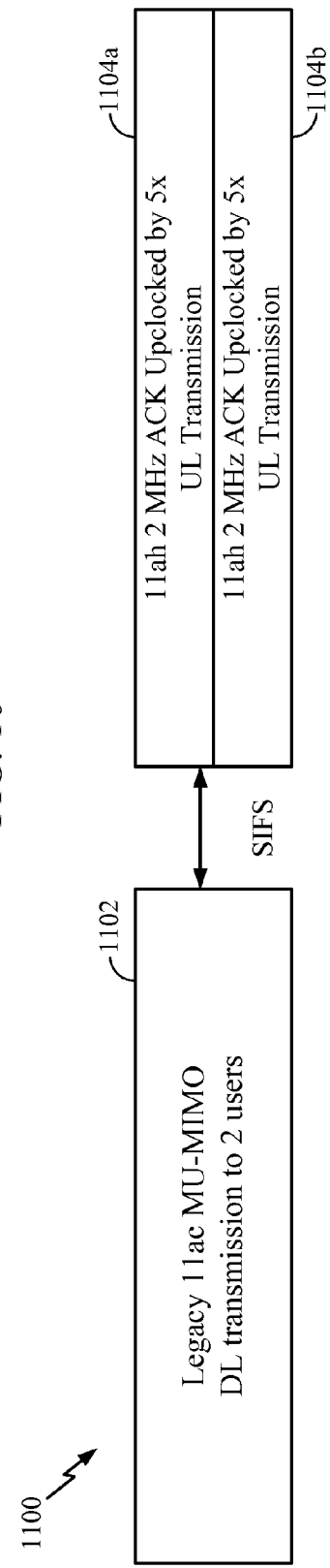
FIG. 11 illustrates an example sequence of transmissions with DL data and UL ACK, in accordance with certain aspects of the present disclosure.

In certain scenarios, the AP may transmit using a larger transmit power than the STAs (i.e., range is UL limited). According to certain aspects, the STAs may transmit only the up-clocked 11ah Preamble and DATA, assuming the medium is reserved by the AP. Medium reservation by the AP may be done, for example, using a CTS-to-Self message or by preceding DL data. FIG. 10 illustrates an example sequence of transmissions 1000 with DL data and UL ACK, in accordance with certain aspects of the present disclosure. For example, as shown in FIG. 10, the DL data may be with a legacy 11n/ac/g/a preamble 1002 and the UL ACK may be with 11ah 2 MHz ACK 1004 upclocked by 5×, In 11ac, the may AP transmit using multiple user (MU) multiple-input multiple-output (MIMO) to N STAs. According to certain aspects, the N STAs may simultaneously transmit only the up-clocked 11ah Preamble and DATA, assuming the medium is reserved by the AP. The medium reservation by the AP may be done using a CTS-to-Self message or preceding DL data. FIG. 11 illustrates an example sequence of transmissions 1100 with DL data and UL ACK, in accordance with certain aspects of the present disclosure. For example, as shown in the FIG. 11, the DL data may be with a legacy 11ac MU-MIMO DL transmission 1102 to two users and UL ACK may be with a 11ah 2 MHz ACK 1104a, 1104b upclocked by 5×.

Figure 12:
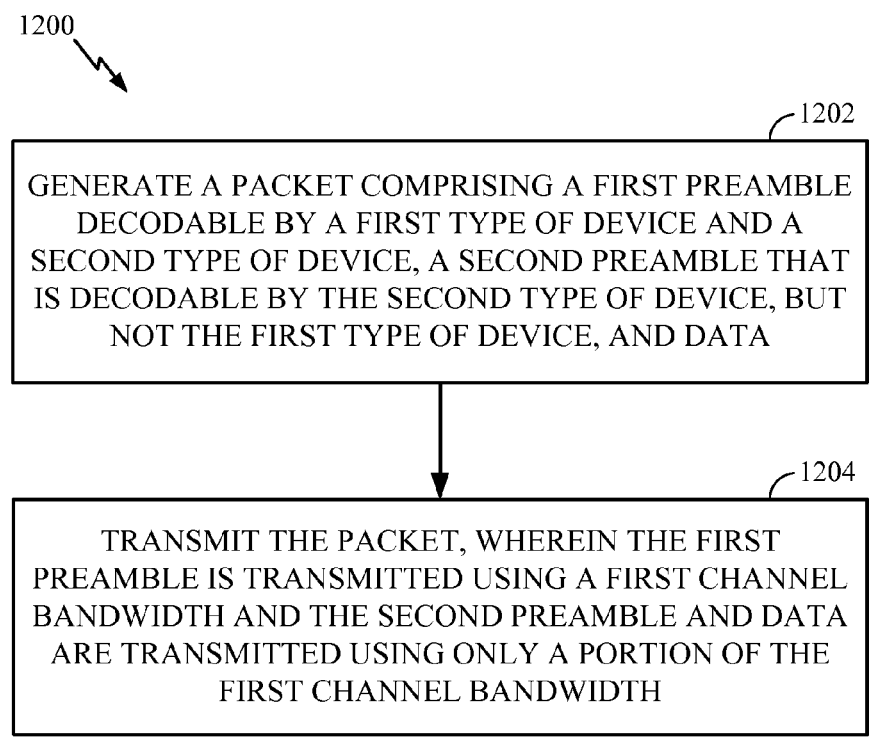
FIG. 12 illustrates example operations for wireless communications by an access point, in accordance with certain aspects of the present disclosure.
Figure 12A:
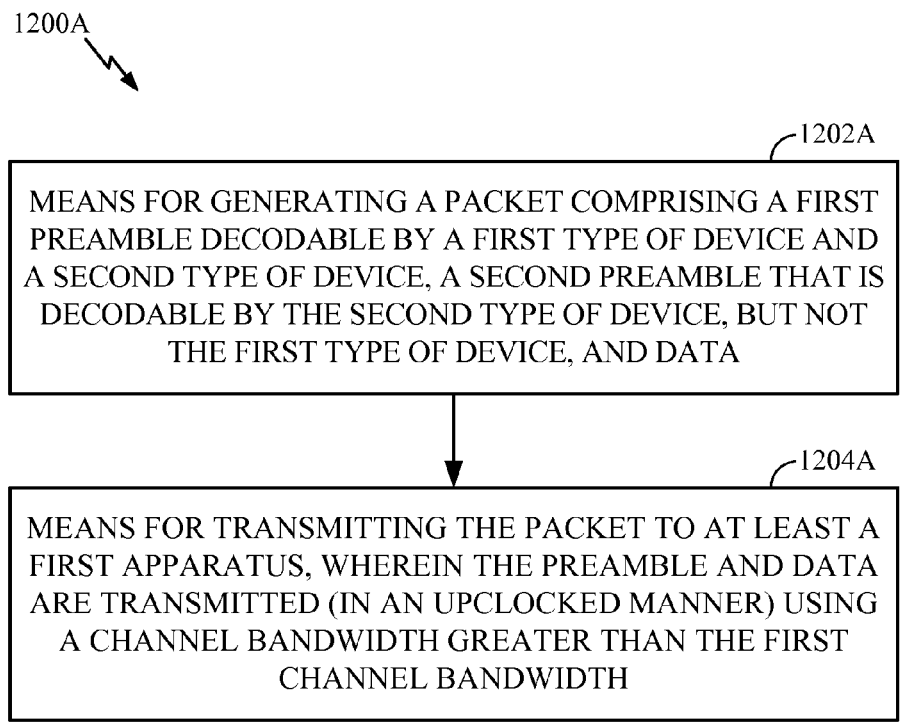
FIG. 12A illustrates example components capable of performing the operations of FIG. 12, in accordance with certain aspects of the present disclosure.

FIG. 12 illustrates example operations 1200 for wireless communications, in accordance with certain aspects of the present disclosure. The operations 1200 may be performed, for example, by an AP (e.g., AP 110). The operations 1200 may begin, at 120,2 by generating a packet comprising a first preamble (e.g., the legacy preamble) decodable by a first type of device (e.g., a legacy device having a first set of capabilities) and a second type of device (e.g., a non-legacy device having a second enhanced set of capabilities), a second preamble (e.g., a New Preamble) that is decodable by the second type of device, but not the first type of device, and data. According to certain aspects, the first preamble may be of a first format defined by a first standard and the second preamble may be of a second format defined by a second standard for transmission at a second channel bandwidth.

The second preamble of the second format may support a larger channel delay spread than the first preamble of the first format.

According to certain aspects, the AP may determine at least one offset location, within the first channel bandwidth, to use for transmitting the second preamble and data. For example, the AP may determine a first offset location for transmitting the second preamble and data to a first apparatus based on a FDM scheme and may determine a second offset location for transmitting the second preamble and data to a second apparatus based on the FDM scheme.

At 1204, the AP may transmit the packet, wherein the first preamble is transmitted using a first channel bandwidth and the second preamble and data are transmitted using only a portion of the first channel bandwidth. According to certain aspects, the second preamble and data may be transmitted in an upclocked manner using a channel bandwidth greater than the defined second channel bandwidth. For example, the second preamble and data may be transmitted using a channel bandwidth that is a multiple of the second channel bandwidth.

Figure 13:
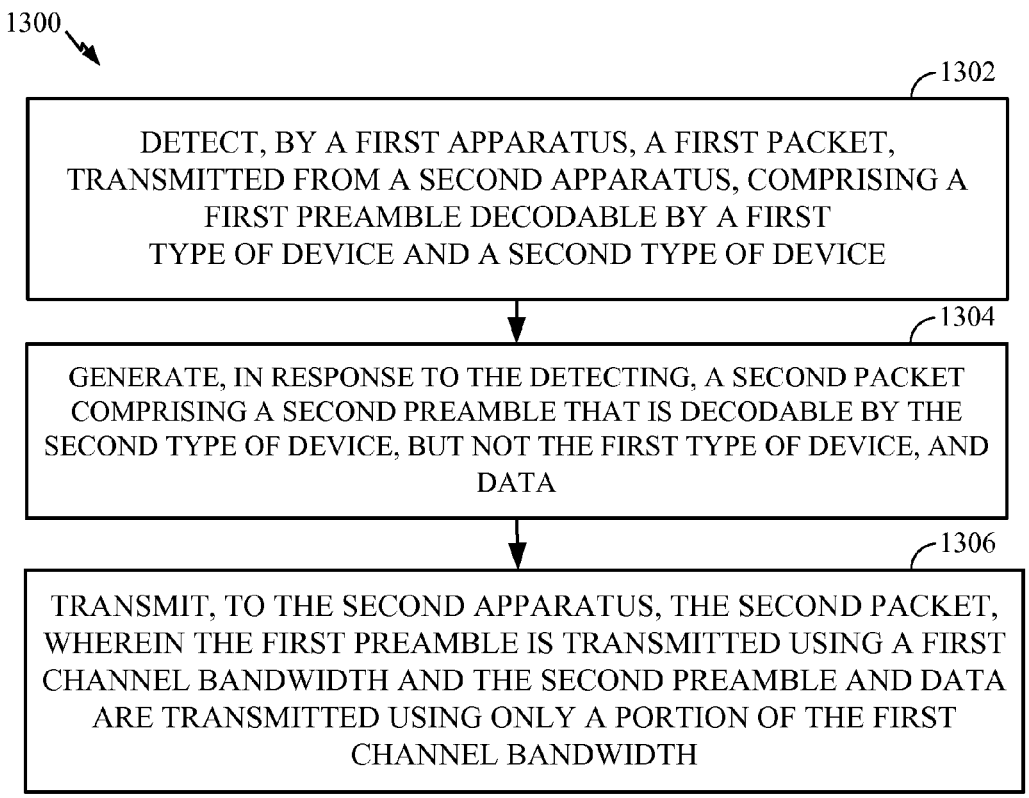
FIG. 13 illustrates example operations for wireless communications by a station, in accordance with certain aspects of the present disclosure.
Figure 13A:
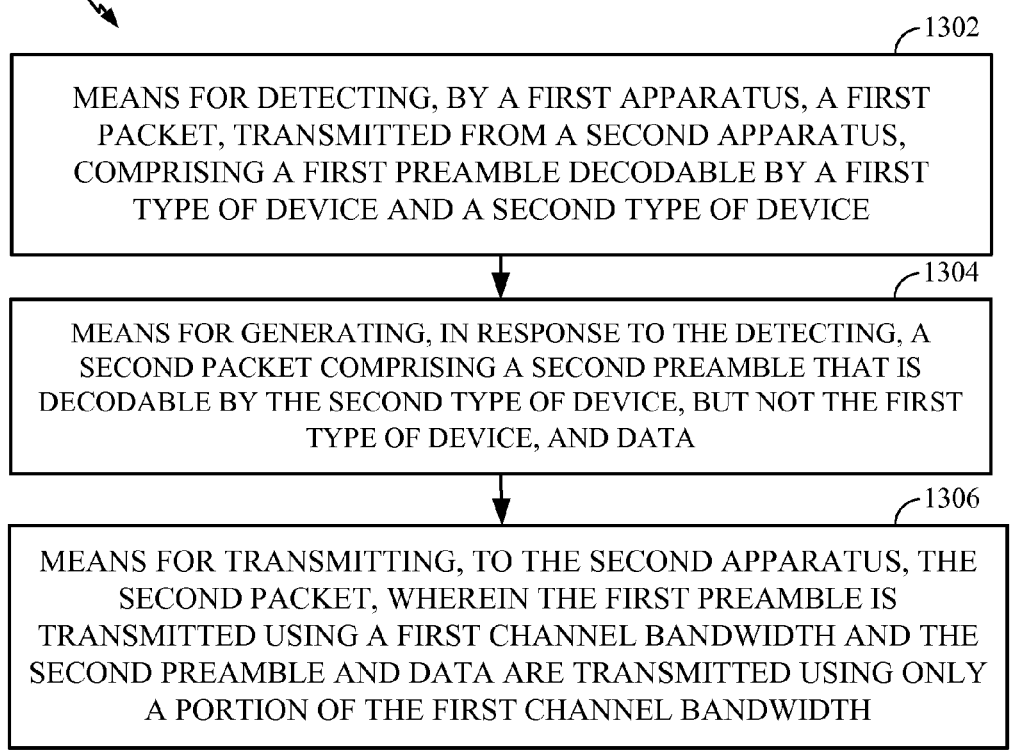
FIG. 13A illustrates example components capable of performing the operations of FIG. 13, in accordance with certain aspects of the present disclosure.

FIG. 13 illustrates example operations 1300 for wireless communications, in accordance with certain aspects of the present disclosure. The operations 1300 may be performed, for example, by a station (e.g., user terminal 120). The operations 1300 may begin, at 1302, by detecting, by a first apparatus, a first packet, transmitted from a second apparatus, comprising a first preamble decodable by a first type of device and a second type of device.

At 1304, the station may generate, in response to the detecting, a second packet comprising a second preamble that is decodable by the second type of device, but not the first type of device, and data; and At 1306, the station may transmit, to the second apparatus, the second packet, wherein the first preamble is transmitted using a first channel bandwidth and the second preamble and data are transmitted using only a portion of the first channel bandwidth.

Accordingly to certain aspects, the detected packet may reserve a medium by the AP for a duration by allowing transmission of the second packet. The first packet may be a MU transmission targeting multiple users and the multiple users may transmit during the duration.

According to certain aspects, the STA may determine an offset location, within the first channel bandwidth, to use for transmitting the second preamble plus data. Multiple offset locations may be assigned to different devices.

Figure 14:
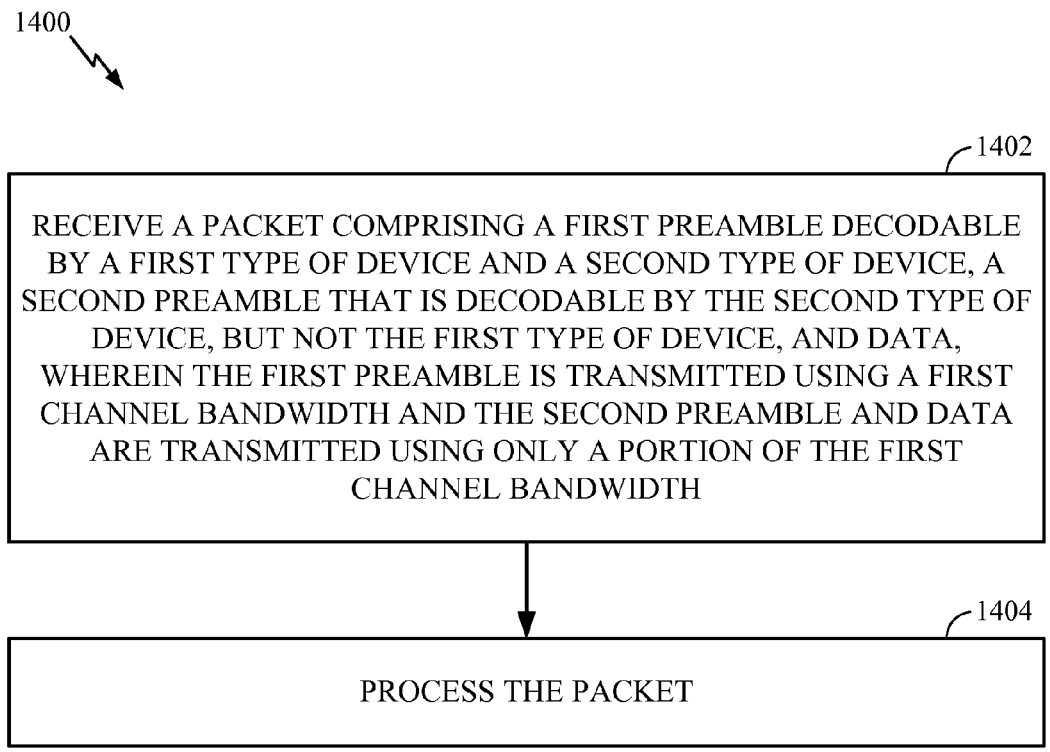
FIG. 14 illustrates example operations for wireless communications by a station, in accordance with certain aspects of the present disclosure.
Figure 14A:
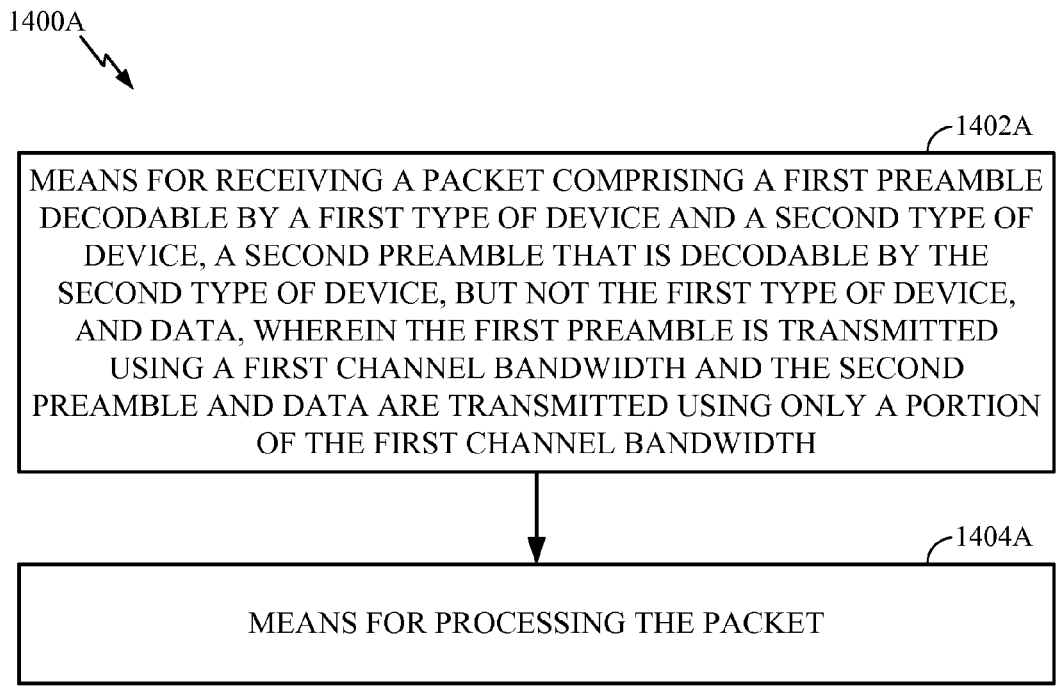
FIG. 14A illustrates example components capable of performing the operations of FIG. 14, in accordance with certain aspects of the present disclosure.

FIG. 14 illustrates example operations 1400 for wireless communications, in accordance with certain aspects of the present disclosure. The operations 1400 may be performed, for example, by a station (e.g., user terminal 120). The operations 1400 may begin at 1402 by receiving a packet comprising a first preamble decodable by a first type of device and a second type of device, a second preamble that is decodable by the second type of device, but not the first type of device, and data, wherein the first preamble is transmitted using a first channel bandwidth and the second preamble and data are transmitted using only a portion of the first channel bandwidth. At 1404, the station may process the packet.

Figure 15:
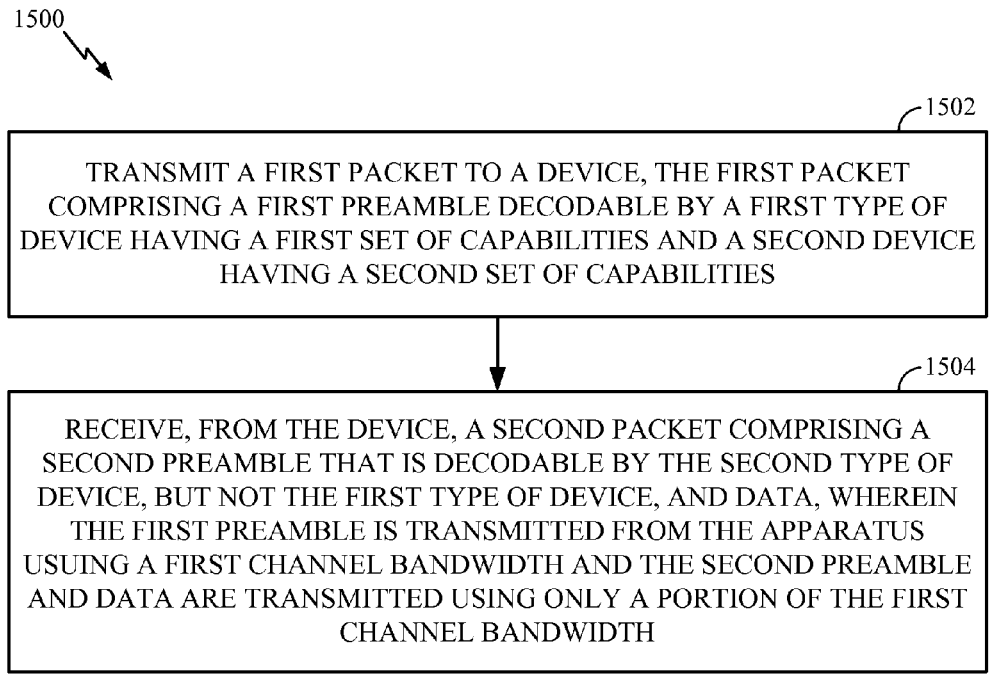
FIG. 15 illustrates example operations for wireless communications by an access point, in accordance with certain aspects of the present disclosure.
Figure 15A:
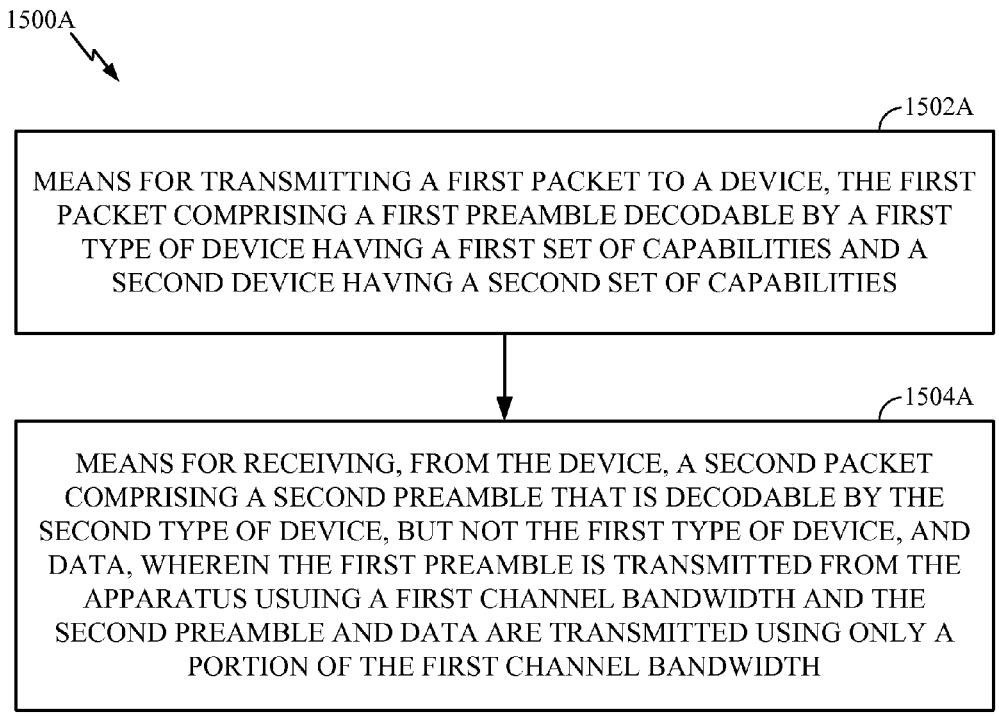
FIG. 15A illustrates example components capable of performing the operations of FIG. 15, in accordance with certain aspects of the present disclosure.

FIG. 15 illustrates example operations 1500 for wireless communications, in accordance with certain aspects of the present disclosure. The operations 1500 may be performed, for example, by an AP (e.g., AP 110). The operations 1500 may begin at 1502 by transmitting a first packet to a device, the first packet comprising a first preamble decodable by a first type of device and a second type of device. At 1504, the access point may receive, from the device, a second packet comprising a second preamble that is decodable by the second type of device, but not the first type of device, and data, wherein the first preamble is transmitted from the apparatus using a first channel bandwidth and the second preamble and data are transmitted using only a portion of the first channel bandwidth.

Figure 16:
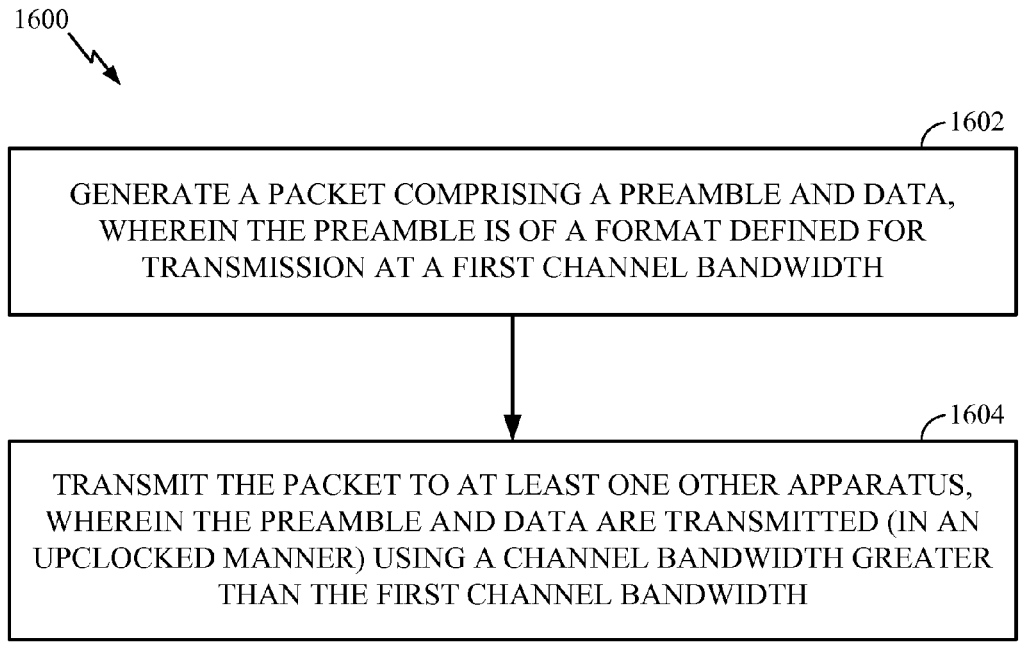
FIG. 16 illustrates example operations for wireless communications by an access point, in accordance with certain aspects of the present disclosure.
Figure 16A:
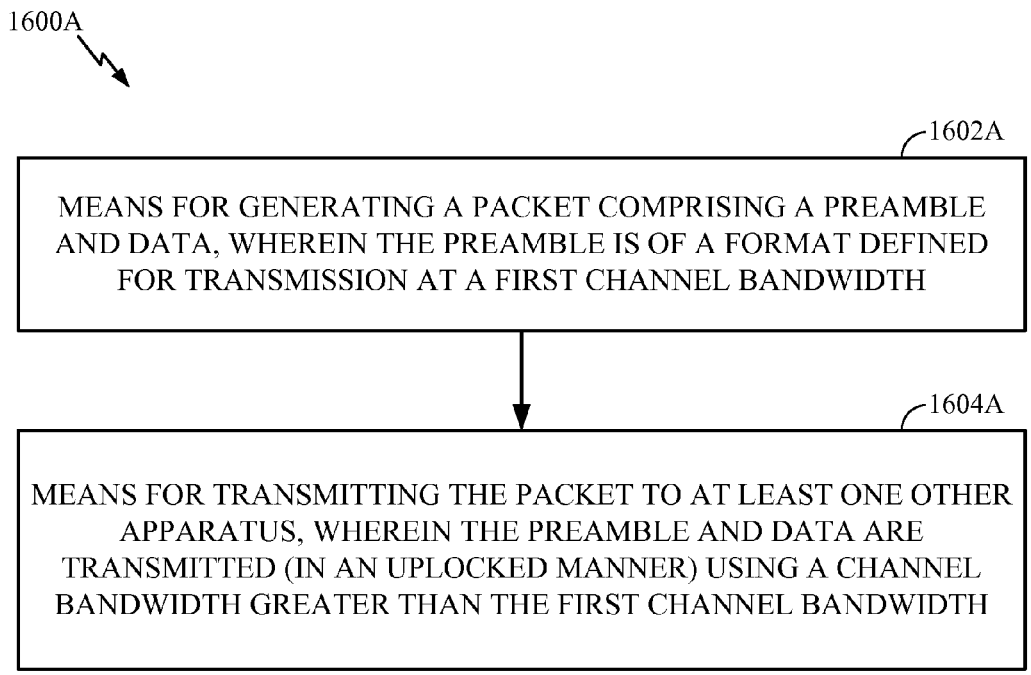
FIG. 16A illustrates example components capable of performing the operations of FIG. 16, in accordance with certain aspects of the present disclosure.

FIG. 16 illustrates example operations 1600 for wireless communications, in accordance with certain aspects of the present disclosure. The operations 1600 may be performed, for example, by an AP (e.g., AP 110). The operations 1600 may begin at 1602 by generating a packet comprising a preamble and data, wherein the preamble is of a format defined for transmission at a first channel bandwidth. At 1604, the access point may transmit the packet to at least one other apparatus, wherein the preamble and data are transmitted in an upclocked manner using a channel bandwidth greater than the first channel bandwidth.

Figure 17:
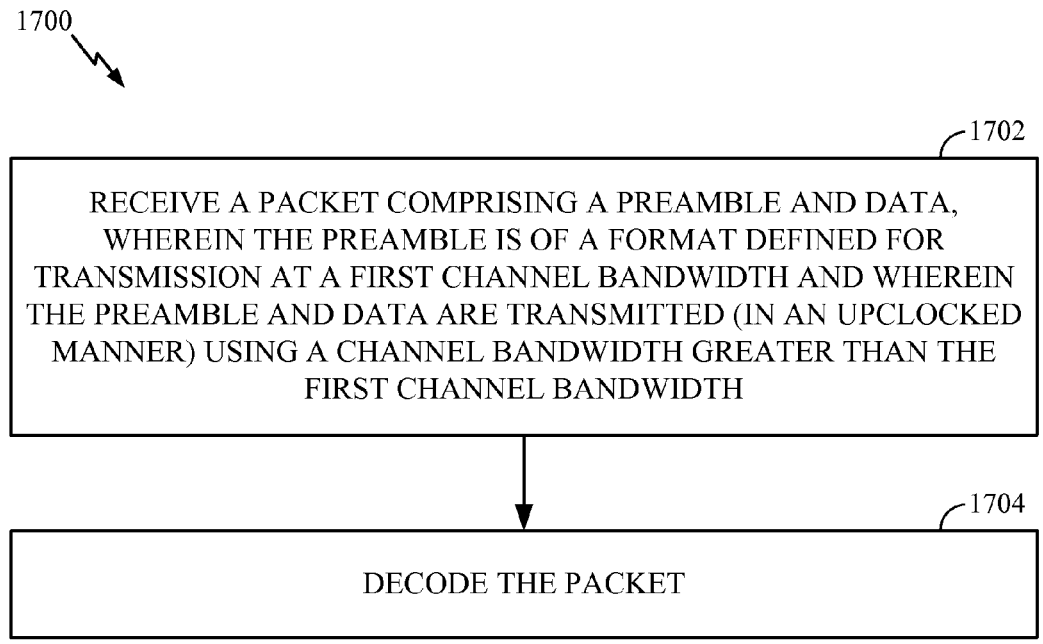
FIG. 17 illustrates example operations for wireless communications by a station, in accordance with certain aspects of the present disclosure.
Figure 17A:
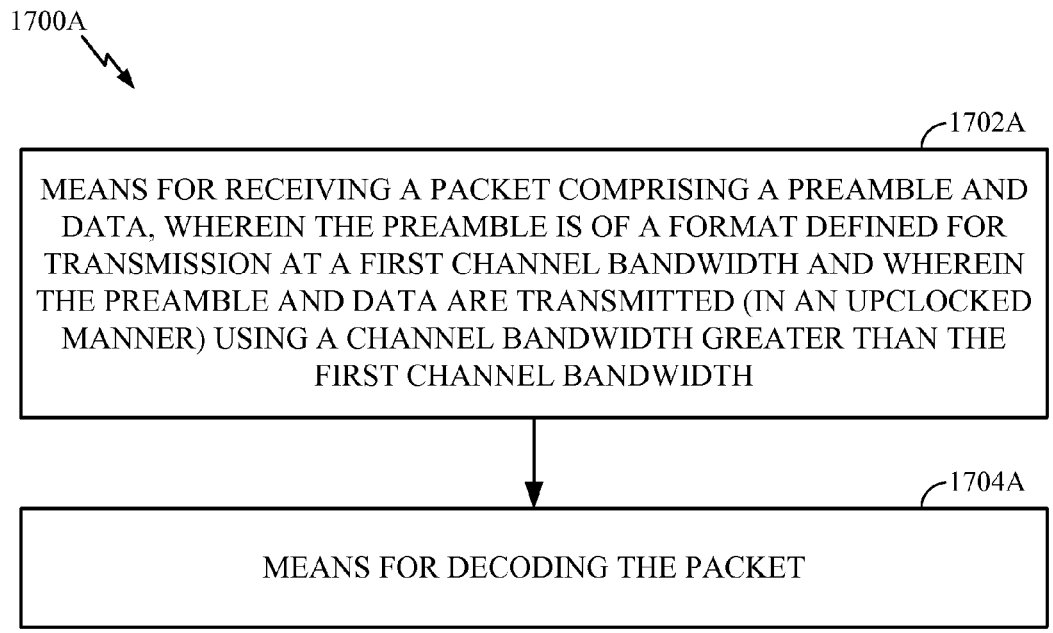
FIG. 17A illustrates example components capable of performing the operations of FIG. 17, in accordance with certain aspects of the present disclosure.

FIG. 17 illustrates example operations 1700 for wireless communications, in accordance with certain aspects of the present disclosure. The operations 1700 may be performed, for example, by a station (e.g., user terminal 120). The operations 1700 may begin at 1702 by receiving a packet comprising a preamble and data, wherein the preamble is of a format defined for transmission at a first channel bandwidth and wherein the preamble and data are transmitted in an upclocked manner using a channel bandwidth greater than the first channel bandwidth. At 1704, the station may decode the packet.

According to certain aspects, rather than transmit a packet with a new preamble and data—by using a format designed for a lower frequency in an upclocked manner, a similar approach may be taken by transmitting a preamble format designed for a higher frequency in a downclocked manner. In such a case, a preamble of such a packet may be backwards compatible with a legacy preamble, for example, allowing legacy devices (802.11a/g/n/ac devices) to decode the preamble and defer until the rest of the transmission is over.

Figure 21:
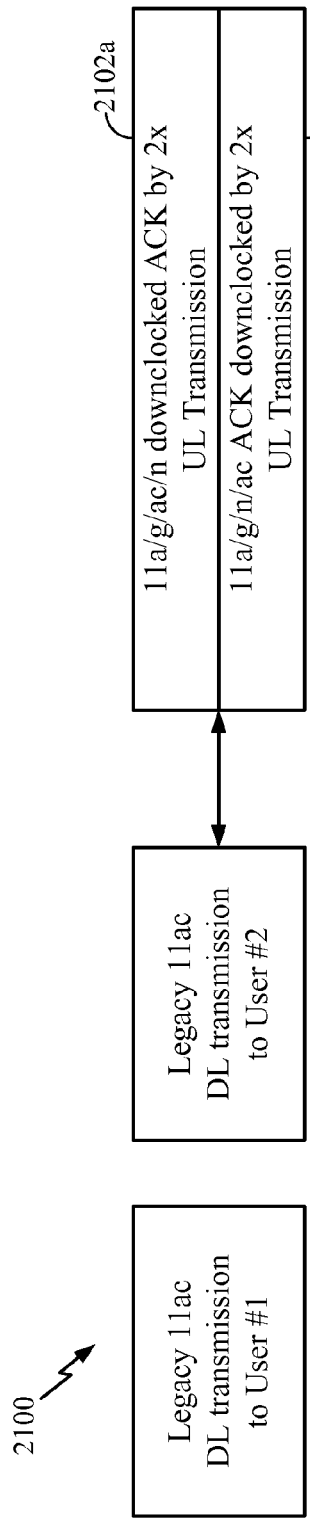
FIG. 21 illustrates an example sequence of transmissions with DL data and UL ACK, in accordance with certain aspects of the present disclosure.

According to certain aspects, this may be accomplished by appending a legacy (e.g., 20 MHz) preamble 406, 408, 410 with a 11a/g/n/ac preamble 1802 that is down-clocked (e.g, by a factor of 2x-10x) followed by DATA 426, for example, as shown in FIG. 18. The effective bandwidth of such a downclocked waveform following the legacy preamble may, therefore, be anywhere from 2 MHz to 10 MHz, depending on the down-clock factor. As with the example formats already described above, although shown at the top in FIG. 18, the frequency domain placement of the downclocked New Preamble 1802 and DATA 426 may include all possible offsets (e.g., top, middle, or bottom) which may allow for FDM of multiple users (e.g., as shown in FIGS. 19 and 21). In some cases, the legacy preamble transmission may be optional.

FIGS. 18-21 illustrate example packet structures 1800, 1900, 2000, 21000 that are analogous to those shown in FIGS. 8-11, but where downclocking is used, rather than upclocking. As illustrated, rather than use of an upclocked 802.11ah preamble plus data, these structures may use downclocked 802.11n/a/g/ac preamble formats. As shown in FIG. 19, multiple users may be multiplexed, via a FDM scheme. As shown in FIG. 20, the medium may be reserved with a CTS-to-SELF message (or by a preceding DL data transmission 2002), followed by a downclocked ACK 2004 sent by the STA. As shown in FIG. 21, for DL MU-MIMO, multiple users may send downclocked ACKs 2102*a*, 2102*b* using different portions of bandwidth (e.g., top, middle, or bottom).

Figure 22A:
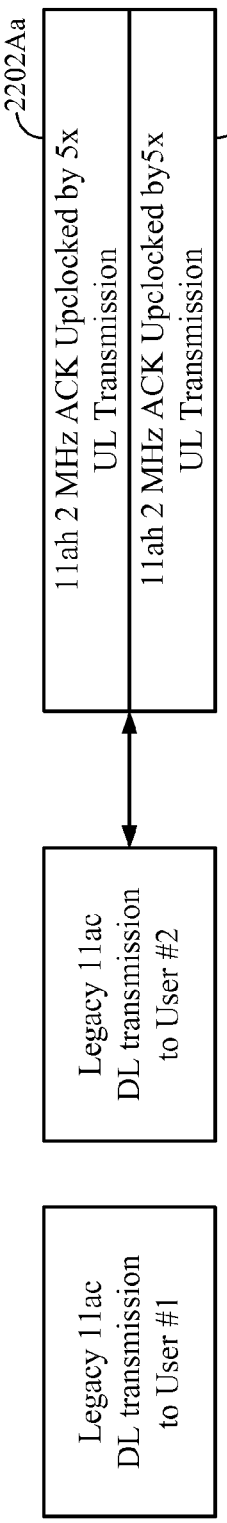
Figure 22B:
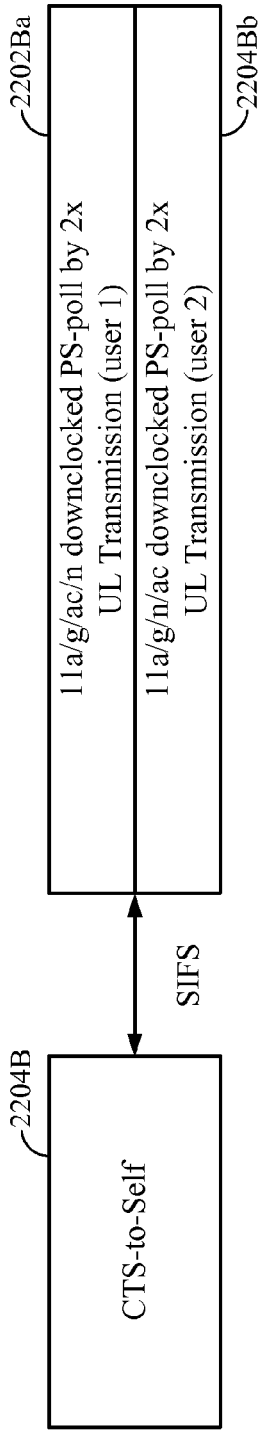

In 802.11ac, an AP may transmit to multiple (e.g., N) STAs, using a regular Carrier Sensing Multiple Access (CSMA) protocol. According to certain aspects, the N STAs may simultaneously transmit the upclocked 11ah preamble and DATA (e.g., ACK) or a "downclocked 11n/a/g/ac preamble and DATA (e.g., ACK) assuming the medium is reserved by the AP. As described above, medium reservation by the AP may be done using a CTS-to-Self message or preceding DL data. Example sequences 2200A, 2200B of transmissions with DL data and UL ACK are illustrated in FIGS. 22A and 22B. For example, FIG. 22A shows using upclocked 11ah preamble 2202Aa, 2202Ab and DATA for multiple users and FIG. 22B shows using downclocked 11n/a/g/ac preamble 2202Ba, 2202Bb and DATA for multiple users and a CTS-to-Self message 2204B.

According to certain aspects, the AP may reserve the medium using a CTS-to-Self message, after which UL transmissions may be scheduled using OFDMA with a downclocked 11n/a/g/ac Preamble and DATA (e.g., ACK, PS-poll, Transport Control Protocol (TCP)-ACK). An example sequence 2300 of transmissions with DL CTS-to-Self 2302 and UL ACKs 2304*a*, 2304*b* is shown in FIG. 23.

In a similar manner, the AP may reserve the medium using a CTS-to-Self, message 2402 after which UL transmissions are scheduled using OFDMA and UL MU-MIMO with downclocked 11n/a/g/ac Preamble and DATA 2404*a*, 2404*b*, 2404*c*, 2404*d* (e.g., ACK, PS-poll, TCP-ACK) from multiple users. An example sequence of such transmissions with DL CTS-to-Self and MU-MIMO UL ACKs (sent from multiple users) is shown in FIG. 24.

Proposed PHY Changes for Outdoor Deployments

In certain cases, wireless operators may look to offload wide area wireless network (WWAN) traffic using a wireless local area network (WLAN). For example, this may be done by adding WiFi to existing long-term evolution (LTE) pico cells for offloading traffic. Such pico and WiFi base stations (BSs) may have high antenna elevation and may transmit at the FCC max of 30 dBm (36 dBm) conducted power (e.g., effective isotropic radiated power (EIRP)) in 2.4 GHz and 5 GHz bands. Example parameters for such deployments are shown in FIG. 25.

Measurements from such sites may report up to a 3 μs delay spread (span). In addition, clients may have limited transmit power (e.g., typically 20 dBm) and may, thus, be required to close the UL. Aspects of the present disclosure provide a scheme that may improve delay spread tolerance and close the UL. For example, using some of the mechanisms discussed above, this may be achieved with relatively minor implementation changes.

Figures 25, 26:
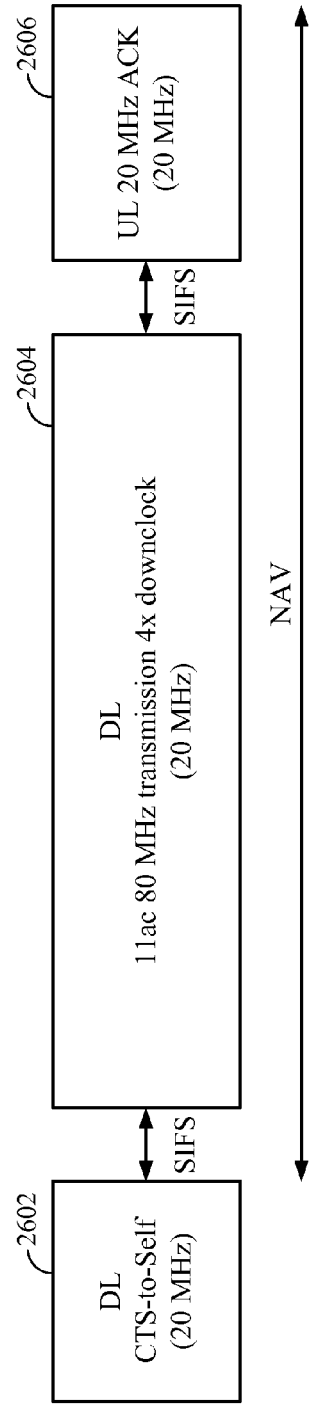
FIG. 25 illustrates example parameters for a deployment of WLAN offloading for WWAN traffic.
FIG. 26-29 illustrates example sequences of transmissions with DL data and an UL ACK, in accordance with certain aspects of the present disclosure.

FIG. 26 shows an example sequence 2600 of transmissions, in accordance with certain aspects of the present disclosure. According to certain aspects, a downlink (DL) clear-to-send (CTS)-to-Self message 2602 may protect the medium with NAV for a subsequent DL transmission (e.g., transmitted as a downclocked 802.11ac transmission 2604), followed by an uplink (UL) acknowledgement (ACK) (which may be sent as a conventional 20 MHZ UL ACK 2606). For the DL CTS 2602, a robust modulation and coding scheme (e.g., MCS0) may be assumed to be decodable even with increased delay spread. In this example, a client receiver station (STA) may run an 80 MHz preamble detector downclocked by 4×, to detect the presence of downclocked DL transmissions.

Figure 27:
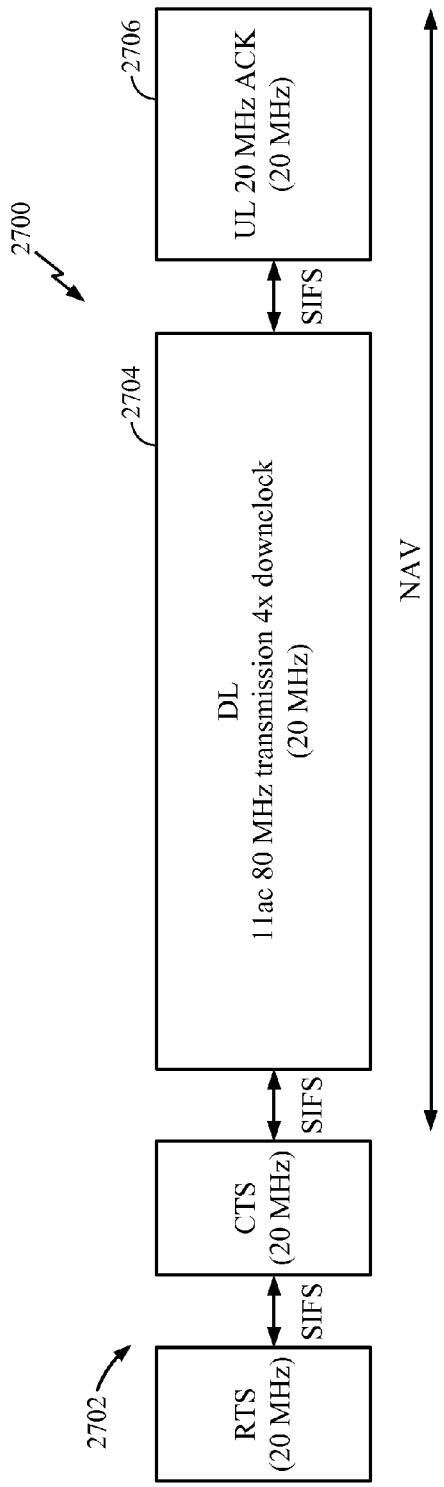

FIG. 27 shows another example sequence 2700 of transmissions utilized in a downclocking scheme, in accordance with certain aspects of the present disclosure. According to certain aspects, a ready-to-send (RTS)-CTS message 2702 may protect the medium with NAV for a subsequent DL transmission (e.g., transmitted as a downclocked 802.11ac transmission 2704), followed by an UL ACK (e.g., sent as a downclocked 20 MHZ UL ACK 2706). For the DL CTS 2702, a robust modulation and coding scheme (e.g., MCS0) may be assumed to be decodable even with increased delay spread. Again, a client receiver STA may run an 80 MHz Preamble detector downclocked by 4×, to detect the presence of downclocked DL transmissions.

Figure 28:
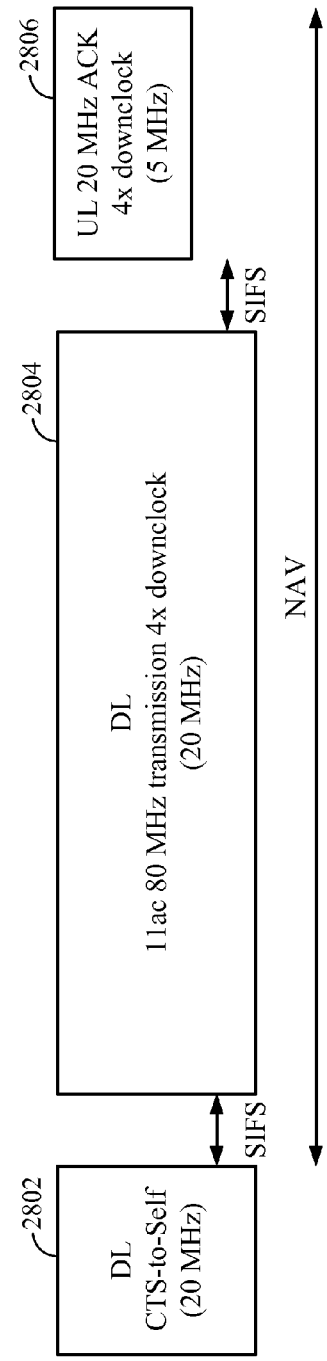

FIG. 28 shows an example sequence 2800 of transmissions utilized in a downclocking scheme, in accordance with certain aspects of the present disclosure. According to certain aspects, a DL CTS-to-Self message 2802 may protect the medium with NAV for a subsequent DL transmission (e.g., transmitted as a downclocked 802.11ac transmission 2804), followed by an UL ACK (which may be sent as a downclocked 20 MHZ UL ACK 2806). For the DL CTS 2802, a robust modulation and coding scheme (e.g., MCS0) may be assumed to be decodable even with increased delay spread.

As such, a client receiver STA may run an 80 MHz Preamble detector downclocked (e.g., by 4×), to detect the presence of downclocked DL transmissions. Similarly, an AP receiver STA may run a 20 MHz preamble detector downclocked (e.g., by 4×), to detect the presence of downclocked ACK transmissions.

Figure 29:
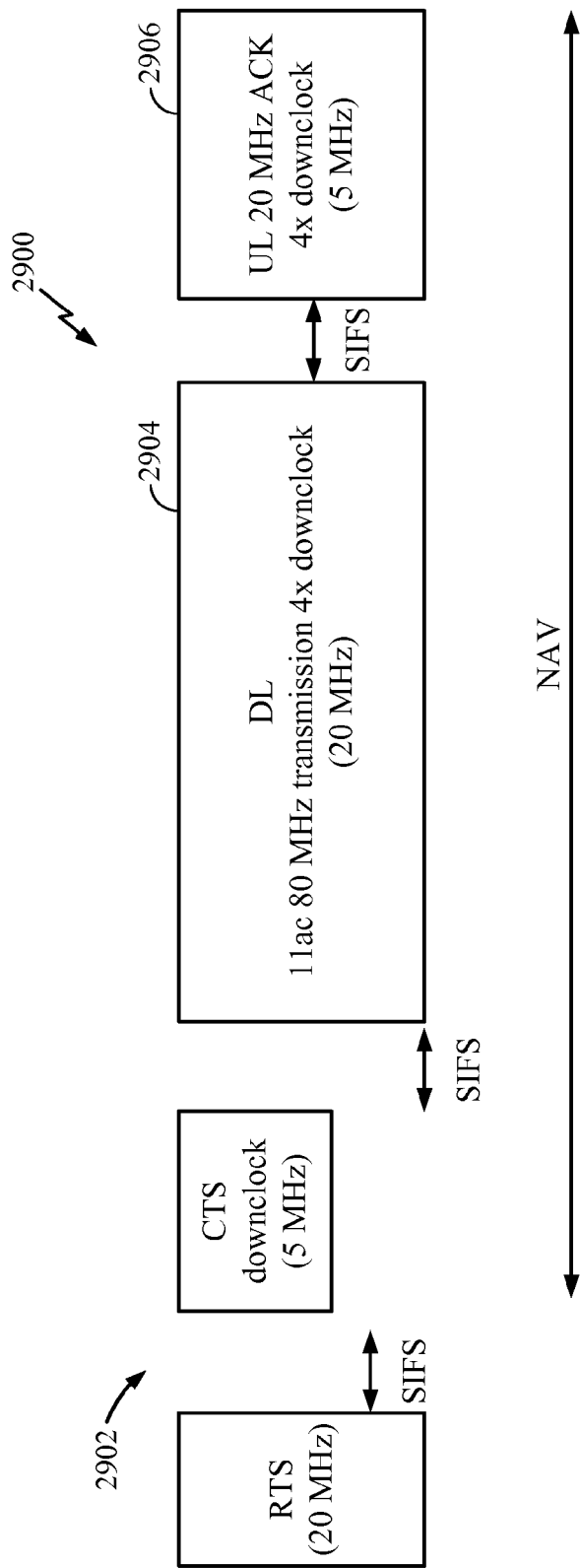

FIG. 29 shows another example sequence 2900 of transmissions utilized in a downclocking scheme, in accordance with certain aspects of the present disclosure. Again, an RTS-CTS 2902 may protect the medium with NAV for a subsequent DL transmission (e.g., transmitted as a downclocked 802.11ac transmission 2904), but in this example, the CTS may be downclocked (e.g., by 4×). Again, the DL transmission may be followed by an UL ACK (e.g., sent as a downclocked 20 MHZ UL ACK 2906). For the DL CTS, a robust modulation and coding scheme (e.g., MCS0) may be assumed to be decodable even with increased delay spread. In this example, a client receiver STA may run an 80 MHz preamble detector downclocked by 4×, to detect the presence of downclocked DL transmissions. An AP receiver STA may run a 20 MHz preamble detector downclocked by 4×, to detect the presence of downclocked ACK transmissions.

According to certain aspects, the UL ACK may be downclocked by other factors (e.g., 8×) to obtain additional noise reduction gains and close the uplink. In any case, the proposed downclocking technique suggested for UL ACK may also be used for sending other UL transmissions, such as a PS-poll. Thus, the AP receiver STA may run a 20 MHz preamble detector downclocked, for example, by 4× to detect the presence of UL transmissions downclocked, for example, by 4×.

According to certain aspects, the CTS-to-self message may be optional. In some cases, a transmission, such as CTS-to-self, may also carry an embedded bit to signal to the New (non-legacy) STAs about the presence of downclocked transmissions. For example, the presence of downclocked transmissions may be indicated via scrambling seed (bit) in an RTS or CTS. Downclocking may also be enabled on a per-STA basis using management frame exchange (e.g., via an "operating mode notification").

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1200, 1300, 1400, 1500, 1600, and 1700 illustrated in FIGS. 12, 13, 14, 15, 16, and 17, may correspond to means 1200A, 1300A, 1400A, 1500A, 1600A, and 1700A illustrated in FIGS. 12A, 13A, 14A, 15A, 16A and 17A.

For example, means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for processing, means for determining, means for altering, means for generating, means for correcting, and/or means for checking may comprise a processing system, which may include one or more processors, such as the RX data processor 270 and/or the controller 280 of the user terminal 120 or the RX data processor 242 and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to generate a packet comprising:
      a first preamble of a first format decodable by a first type of device and a second type of device,
      a second preamble of a second format that is decodable by the second type of device but not the first type of device, and
      data; and
   a transmitter configured to transmit the packet, wherein the first preamble is transmitted using a first channel bandwidth and the second preamble and data are transmitted in an upclocked manner using only a portion of the first channel bandwidth, wherein the second format is associated with transmission at a second channel bandwidth, wherein the portion of the first channel bandwidth is greater than the second channel bandwidth, and wherein the portion of the first channel bandwidth is a multiple of the second channel bandwidth.

2. The apparatus of claim 1, wherein the second format can support a larger channel delay spread, as compared to the first format.

3. The apparatus of claim 1, wherein the processing system is further configured to determine at least one offset location, within the first channel bandwidth, to use for transmitting the second preamble and data.

4. The apparatus of claim 3, wherein the determining comprises:
determining a first offset location for transmitting the second preamble and data to a first type of device based on a frequency division multiplexing scheme; and
determining a second offset location for transmitting the second preamble and data to a second type of device based on the frequency division multiplexing scheme.

5. The apparatus of claim 1, further comprising at least one antenna via which the transmitter transmits the packet, wherein the apparatus is configured as an access point.

6. An apparatus for wireless communications, comprising:
a processing system configured to:
detect a first packet, transmitted from a second apparatus, comprising a first preamble of a first format decodable by a first type of device and a second type of device, and
generate, in response to the detecting, a second packet comprising a second preamble of a second format that is decodable by the second type of device, but not the first type of device,
and data; and
a transmitter configured to transmit, to the second apparatus, the second packet, wherein the first preamble is transmitted using a first channel bandwidth and the second preamble and data are transmitted in an upclocked manner using only a portion of the first channel bandwidth, wherein the second format is associated with transmission at a second channel bandwidth, wherein the portion of the first channel bandwidth is greater than the second channel bandwidth, and wherein the portion of the first channel bandwidth is a multiple of the second channel bandwidth.

7. The apparatus of claim 6, wherein the processing system is configured to determine, based on the first packet, a duration a medium is reserved by the second apparatus allowing transmission of the second packet.

8. The apparatus of claim 7, wherein:
the first packet comprises a multi-user transmission targeting multiple users; and
the processing system is further configured to determine that the apparatus is one of the targeted multiple users.

9. The apparatus of claim 6, wherein the processing system is further configured to determine an offset location, within the first channel bandwidth, to use for transmitting the second preamble and data.

10. The apparatus of claim 9, wherein:
multiple offset locations are assigned to different devices; and
determining the offset location comprises determining an offset location assigned to the apparatus.

11. The apparatus of claim 6, further comprising at least one antenna via which the transmitter transmits the second packet, wherein the apparatus is configured as a user terminal.

12. A method for wireless communications, comprising:
generating a packet comprising:
a first preamble of a first format decodable by a first type of device and a second type of device,
a second preamble of a second format that is decodable by the second type of device but not the first type of device, and
data; and
transmitting the packet, wherein the first preamble is transmitted using a first channel bandwidth and the second preamble and data are transmitted in an upclocked manner using only a portion of the first channel bandwidth, wherein the second format is associated with transmission at a second channel bandwidth, wherein the portion of the first channel bandwidth is greater than the second channel bandwidth, and wherein the portion of the first channel bandwidth is a multiple of the second channel bandwidth.

13. The method of claim 12, wherein the second format can support a larger channel delay spread, as compared to the first format.

14. The method of claim 12, further comprising determining at least one offset location, within the first channel bandwidth, to use for transmitting the second preamble and data.

15. The method of claim 14, wherein the determining comprises:
determining a first offset location for transmitting the second preamble and data to a first type of device based on a frequency division multiplexing scheme; and
determining a second offset location for transmitting the second preamble and data to a second type of device based on the frequency division multiplexing scheme.

16. A method for wireless communications, comprising:
detecting, by a first apparatus, a first packet, transmitted from a second apparatus, comprising a first preamble of a first format decodable by a first type of device and a second type of device;
generating, in response to the detecting, a second packet comprising a second preamble of a second format that is decodable by the second type of device, but not the first type of device, and data; and
transmitting, to the second apparatus, the second packet, wherein the first preamble is transmitted using a first channel bandwidth and the second preamble and data are transmitted in an upclocked manner using only a portion of the first channel bandwidth, wherein the second format is associated with transmission at a second channel bandwidth, wherein the portion of the first channel bandwidth is greater than the second channel bandwidth, and wherein the portion of the first channel bandwidth is a multiple of the second channel bandwidth.

17. The method of claim 16, further comprising:
determining, based on the first packet, a duration a medium is reserved by the second apparatus allowing transmission of the second packet.

18. The method of claim 17, wherein:
the first packet comprises a multi-user transmission targeting multiple users; further comprising:
determining that the first apparatus is one of the targeted multiple users.

19. The method of claim 16, further comprising determining an offset location, within the first channel bandwidth, to use for transmitting the second preamble and data.

20. The method of claim 19, wherein:
multiple offset locations are assigned to different devices; and
determining the offset location comprises determining an offset location assigned to the first apparatus.

* * * * *